United States Patent
Wittenstein et al.

(10) Patent No.: US 9,774,517 B2
(45) Date of Patent: Sep. 26, 2017

(54) CORRELATIVE MONITORING, ANALYSIS, AND CONTROL OF MULTI-SERVICE, MULTI-NETWORK SYSTEMS

(71) Applicant: EMC IP Holding Company LLC, Hopkinton, MA (US)

(72) Inventors: Andreas Wittenstein, Woodacre, CA (US); Mike Eynon, Mountain View, CA (US); Rakesh Nair, Mountain View, CA (US); Richard Chiles, Castro Valley, CA (US); Brian Campbell, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 743 days.

(21) Appl. No.: 13/685,639

(22) Filed: Nov. 26, 2012

(65) Prior Publication Data

US 2014/0149569 A1   May 29, 2014

(51) Int. Cl.
  *H04L 12/26*   (2006.01)
  *H04L 12/24*   (2006.01)

(52) U.S. Cl.
  CPC ............. *H04L 43/12* (2013.01); *H04L 41/12* (2013.01); *H04L 43/028* (2013.01); *H04L 43/106* (2013.01)

(58) Field of Classification Search
  None
  See application file for complete search history.

(56) References Cited

U.S. PATENT DOCUMENTS

| | | | | |
|---|---|---|---|---|
| 6,671,818 B1* | 12/2003 | Mikurak | ............... | G06Q 10/06 714/4.21 |
| 6,807,583 B2* | 10/2004 | Hrischuk et al. | ............ | 719/318 |
| 7,293,238 B1* | 11/2007 | Brook | ................ | H04L 63/1416 709/224 |
| 7,716,742 B1* | 5/2010 | Roesch | ............... | H04L 63/1433 726/25 |
| 7,962,321 B2* | 6/2011 | de Kleer | ......................... | 703/14 |
| 9,053,000 B1* | 6/2015 | Lam et al. | | |
| 9,082,122 B2* | 7/2015 | Ngan | ..................... | G06Q 20/12 |
| 2002/0152185 A1* | 10/2002 | Satish Jamadagni | ............. | 706/1 |
| 2003/0004688 A1* | 1/2003 | Gupta et al. | .................. | 702/188 |
| 2003/0070003 A1* | 4/2003 | Chong et al. | ................. | 709/330 |
| 2003/0110396 A1* | 6/2003 | Lewis et al. | ................. | 713/201 |
| 2004/0243349 A1* | 12/2004 | Greifeneder et al. | ........ | 702/183 |
| 2004/0261030 A1* | 12/2004 | Nazzal | .................... | H04L 63/14 715/738 |
| 2005/0286423 A1* | 12/2005 | Poletto | ............... | H04L 63/1425 370/235 |
| 2006/0067220 A1* | 3/2006 | Poletto | ............... | H04L 63/0218 370/230.1 |
| 2006/0149674 A1* | 7/2006 | Cook et al. | ..................... | 705/44 |
| 2006/0233101 A1* | 10/2006 | Luft | ........................ | H04L 47/20 370/229 |

(Continued)

*Primary Examiner* — Greg C Bengzon
(74) *Attorney, Agent, or Firm* — BainwoodHuang

(57) ABSTRACT

Methods and devices for correlative monitoring, analysis, and control of multi-service, multi-network systems are provided herein. Exemplary methods may include generating a network topology graph of a metanetwork using traffic records obtained from the metanetwork, generating a causal digraph of the metanetwork using the traffic records and the network topology graph, and transmitting one or more of the network topology graph and the causal digraph to a computing system.

21 Claims, 34 Drawing Sheets

(56) References Cited

U.S. PATENT DOCUMENTS

| | | | |
|---|---|---|---|
| 2007/0177523 A1* | 8/2007 | Nagami et al. | 370/252 |
| 2007/0180526 A1* | 8/2007 | Copeland, III | H04L 63/1441 726/23 |
| 2007/0234409 A1* | 10/2007 | Eisen | H04L 63/0876 726/6 |
| 2008/0028463 A1* | 1/2008 | Dagon | H04L 29/12066 726/22 |
| 2008/0028467 A1* | 1/2008 | Kommareddy et al. | 726/23 |
| 2008/0201772 A1* | 8/2008 | Mondaeev et al. | 726/13 |
| 2009/0168645 A1* | 7/2009 | Tester et al. | 370/225 |
| 2009/0216666 A1* | 8/2009 | Antao | G06Q 10/10 705/30 |
| 2009/0254989 A1* | 10/2009 | Achan | H04L 63/1441 726/22 |
| 2010/0023919 A1* | 1/2010 | Chaar et al. | 717/101 |
| 2010/0049676 A1* | 2/2010 | Devitt et al. | 706/12 |
| 2010/0077077 A1* | 3/2010 | Devitt | 709/224 |
| 2010/0094767 A1* | 4/2010 | Miltonberger | 705/325 |
| 2010/0192226 A1* | 7/2010 | Noel et al. | 726/23 |
| 2010/0318855 A1* | 12/2010 | Beg et al. | 714/39 |
| 2011/0126136 A1* | 5/2011 | Abella | H04L 43/028 715/764 |
| 2011/0167031 A1* | 7/2011 | Kleinberg | G06N 5/04 706/52 |
| 2011/0277034 A1* | 11/2011 | Hanson | 726/25 |
| 2012/0096145 A1* | 4/2012 | Le | G06Q 50/265 709/224 |
| 2012/0131674 A1* | 5/2012 | Wittenschlaeger | H04L 63/1425 726/23 |
| 2012/0170470 A1* | 7/2012 | Duchenay | H04L 43/106 370/252 |
| 2012/0240185 A1* | 9/2012 | Kapoor | H04L 63/1425 726/1 |
| 2013/0019008 A1* | 1/2013 | Jorgenson et al. | 709/224 |
| 2013/0019309 A1* | 1/2013 | Strayer et al. | 726/23 |
| 2013/0097308 A1* | 4/2013 | Le | H04L 67/22 709/224 |
| 2013/0097463 A1* | 4/2013 | Marvasti et al. | 714/47.1 |
| 2013/0117852 A1* | 5/2013 | Stute | H04L 63/1425 726/23 |
| 2013/0227689 A1* | 8/2013 | Pietrowicz | G01R 1/20 726/23 |
| 2013/0305357 A1* | 11/2013 | Ayyagari et al. | 726/22 |
| 2013/0305369 A1* | 11/2013 | Karta | H04L 63/1416 726/23 |
| 2013/0332361 A1* | 12/2013 | Ciurea | G06Q 20/405 705/44 |
| 2014/0082730 A1* | 3/2014 | Vashist et al. | 726/23 |
| 2014/0090071 A1* | 3/2014 | Salehie et al. | 726/25 |
| 2014/0157407 A1* | 6/2014 | Krishnan et al. | 726/22 |
| 2014/0310808 A1* | 10/2014 | Yao et al. | 726/22 |
| 2014/0324677 A1* | 10/2014 | Walraven | G06Q 20/4016 705/39 |
| 2015/0026027 A1* | 1/2015 | Priess | G06Q 40/00 705/35 |

\* cited by examiner

CORRELATIVE MONITORING, ANALYSIS, AND CONTROL OF MULTI-SERVICE, MULTI-NETWORK SYSTEMS

FIELD OF THE TECHNOLOGY

The present technology relates to computer network systems and methods for monitoring, correlative analysis, and control of traffic within multifaceted networks (e.g., plural services, plural networks) to improve detection of and defense against attacks on the network, maintenance of efficient network operations, and marketing research.

BACKGROUND OF THE DISCLOSURE

An individual service operating in a computer network may utilize its own built-in features for monitoring, analysis, and control of operations and associated network traffic. However, developers, maintainers, and operators of a service cannot be expected to have as high a level of sophistication and expertise as network efficiency and monitoring specialists.

Additionally, demands for network monitoring, analysis, and control for such purposes as security, antifraud, forensics, operations, system administration, and marketing research are frequently changing. This rapid change is due, at least in part, to the rapid proliferation and evolution of network services, security and fraud threats, network resource usage patterns, and user behaviors.

Thus, even when a network offers its own monitoring, analysis, and control (MAC) features, those features may not be designed to meet the needs of specific MAC tasks. Moreover, these MAC features may not function as designed, due to incomplete or faulty implementation. Oftentimes these MAC features are inadequately documented due to incomplete, incorrect, obsolete, or lost documentation.

SUMMARY OF THE DISCLOSURE

According to some embodiments, the present technology may be directed to methods that comprise: (a) generating a network topology graph of a metanetwork using traffic records obtained from the metanetwork; (b) generating a causal digraph of the metanetwork using the traffic records and the network topology graph; and (c) transmitting one or more of the network topology graph and the causal digraph to a computing system.

According to other embodiments, the present technology may be directed to systems that comprise: (a) at least computing device comprising: (i) a memory that includes executable instructions; and (ii) a processor executing the instructions to: (1) generate a network topology graph of a metanetwork using traffic records obtained from the metanetwork; (2) generate a causal digraph of the metanetwork using the traffic records; and (3) transmit one or more of the network topology graph and the causal digraph to a computing system.

According to some embodiments, the present technology may be directed to non-transitory computer readable storage mediums having a computer program embodied thereon. The computer program is executable by a processor in a computing system to perform a method that includes the steps of: (a) generating a network topology graph of a metanetwork using traffic records obtained from the metanetwork; (b) generating a causal digraph of the metanetwork using the traffic records and the network topology graph; and (c) transmitting one or more of the network topology graph and the causal digraph to a computing system.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF EXEMPLARY EMBODIMENTS

Figure 1:
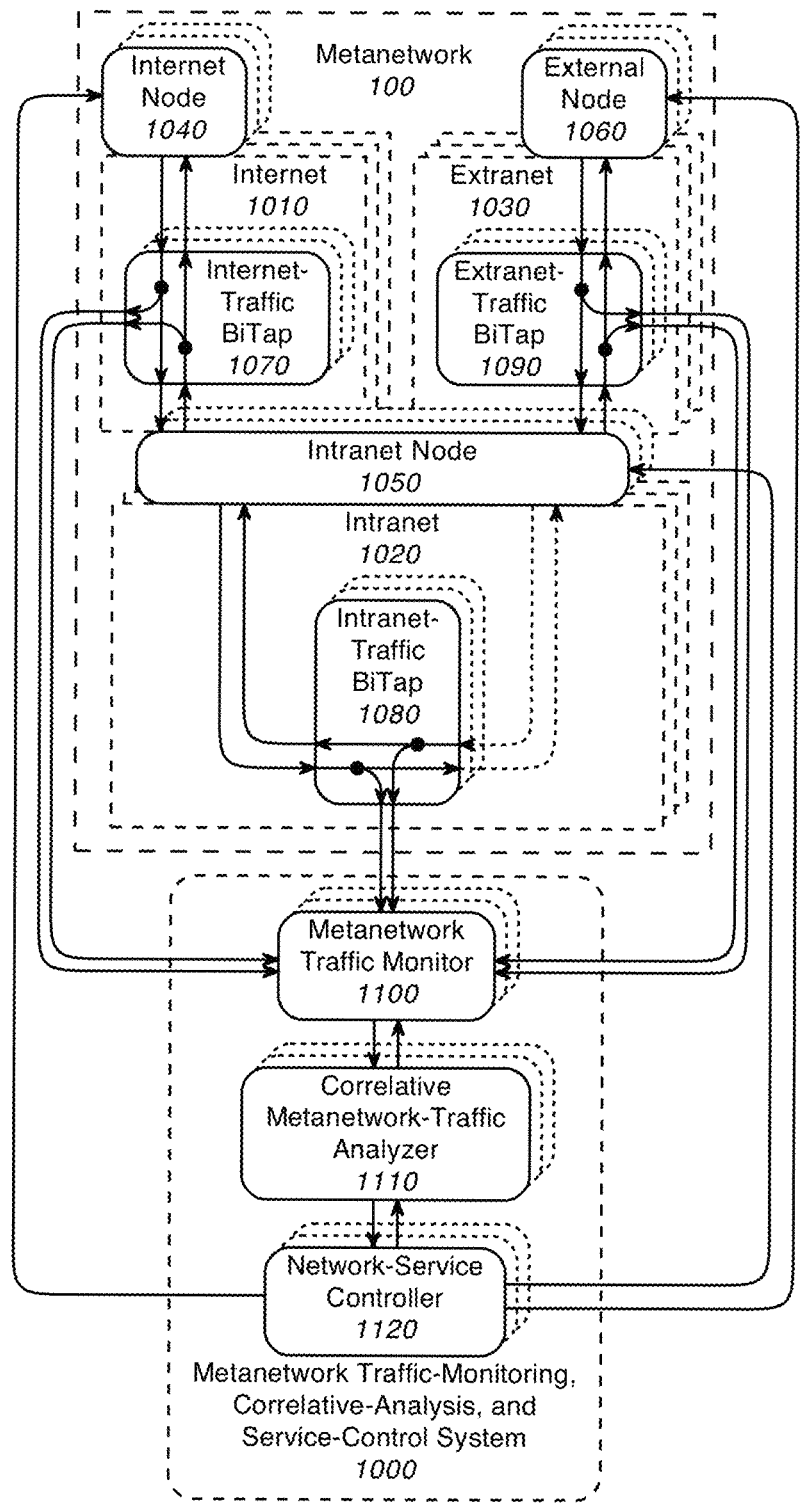
FIG. 1 is a data-flow diagram of an apposed metanetwork traffic-monitoring, correlative-analysis, and service-control (AMAC) system nonintercessorily tapping Internet, intranet, and extranet traffic.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Definitions adidentifier, adidentifying: (of data records or fields) providing supplemental distinguishing information conforming to search criteria, if any.

antecedent: (of an event) occurring before another event (a consequent) to which it is communicatively connected in a causal relationship by a contiguous chain of euchronological events, wherein the members of each contiguous pair belong to temporally correlated and coinformative classes of events.

apposed: (of a subsystem) attached to a system without directly impeding any of its preexisting traffic.

assay: (of taps, records, or fields) a comparand compared to a reference criterion (the probe) to determine if it is the target sought.

bishunt: a system or method for editing information in a bidirectional communication channel, including exposing, imposing, diverting, blocking, or substituting information in each channel.

bitap: a system or method for exposing (and imposing) information in a bidirectional communication channel.

bus: [standard network definition]

causal: (of events) being apparently causally related in being communicatively connected by a contiguous chain of euchronological events (antecedents and consequents), wherein the members of each contiguous pair belong to temporally correlated and coinformative classes of events.

client: [standard network definition]

coidentifier, coidentifying: (of data fields) serving to identify disparate items.

coinformation, coinformative: (of data records or fields) providing supplemental distinguishing information, without regard to conformance to search criteria.

concausal: (of events) being potentially causally related in being communicatively connected by a contiguous chain of euchronological events (precursors and postcursors), wherein the members of each contiguous pair belong to temporally correlated, but not necessarily coinformative, classes of events.

consequent: (of an event) occurring after another event (an antecedent) to which it is communicatively connected in a causal relationship by a contiguous chain of euchronological events, wherein the members of each contiguous pair belong to temporally correlated and coinformative classes of events.

daisy-chain: [standard network definition]

equivalent: (of data records or fields) being bijectively related, with allowance for exceptions such as translation errors due to format limitations, and transmission errors.

euchronological: a temporally ordered relationship between events, in which no follower can occur before information about its leader can have been communicated to it.

extap: a system or method for exposing information in a communication channel.

extranet: [standard network definition]

follower, following: (of an event) occurring euchronologically after another (leading) event in a procausal relationship, the leader and follower not necessarily belonging to temporally correlated or coinformative classes of events.

hub: [standard network definition]

identifying: (of data records or fields) providing equivalent distinguishing information.

inport: an input port.

intap: a system or method for imposing information in a communication channel.

Internet: [standard network definition]

intranet: [standard network definition]

interposed: (of a subsystem) attached to a system so as to mediate all traffic between two or more of its preexisting subsystems.

intertap: a system or method for exposing and imposing information in a communication channel.

leader, leading: (of an event) occurring euchronologically before another (following) event in a procausal relationship, the leader and follower not necessarily belonging to temporally correlated or coinformative classes of events.

metanetwork: a combination of two or more interconnected networks, such as the Internet, one or more intranets, and one or more extranets.

multiplexer: a system or method for combining and labeling plural streams of information into a single stream.

multishunt: a system or method for editing information in a multiple communication channels, including exposing, imposing, diverting, blocking, or substituting information in each channel.

multitap: a system or method for exposing (and imposing) information in multiple communication channels.

node: [standard network definition]

obtrusive: (of a subsystem) presenting significant obstacles to usability in conjunction with an existing system, such as difficulties in installation, integration, ongoing use, or maintenance.

outport: an output port.

port: [standard network definition]

preceding, predecessive, predecessor: (of an event) occurring before another event (a successor) to which it is communicatively connected in a procausal relationship by a contiguous chain of euchronological events, the predecessors and successors not necessarily belonging to temporally correlated or coinformative classes of events.

precursing, precursive, precursor: (of an event) occurring before another event (a postcursor) to which it is communicatively connected in a concausal relationship by a contiguous chain of euchronological events, wherein the members of each contiguous pair belong to temporally correlated, but not necessarily coinformative, classes of events.

postcursing, postcursive, postcursor: (of an event) occurring after another event (a precursor) to which it is communicatively connected in a concausal relationship by a contiguous chain of euchronological events, wherein the members of each contiguous pair belong to temporally correlated, but not necessarily coinformative, classes of events.

probe: (of taps, records, or fields) the comparand serving as a reference criterion to which other comparands (assays) are compared in order to find the target.

procausal: (of events) being potentially causally related in being communicatively connected by a contiguous chain of euchronological events (immediate predecessors and immediate successors), without regard to their temporal correlation or coinformativeness.

server: [standard network definition]

shunt: a system or method for editing information in a communication channel, including exposing, imposing, diverting, blocking, or substituting information in the channel.

succeeding, successive, successor: (of an event) occurring after another event (a predecessor), to which it is communicatively connected in a procausal relationship by a contiguous chain of euchronological events, the predecessors and successors not necessarily belonging to temporally correlated or coinformative classes of events.

switch: [standard network definition]

terminator: [standard network definition]

token-ring: [standard network definition]

unishunt: a system or method for editing information in a unidirectional communication channel, including exposing, imposing, diverting, blocking, or substituting information in the channel.

unitap: a system or method for exposing (and imposing) information in a unidirectional communication channel.

unobtrusive: (of a subsystem) presenting no significant obstacles to usability in conjunction with an existing system.

user identifier: any datum yielding information about the identity of a user, such as user IP address; user IP address geolocation; user proxy IP address; user name; user ID; user password; user GUID; user 'User-Agent' HTTP header; user 'Accepts . . . ' HTTP header; user organization; user physical address; user email address; user telephone, mobile, or fax number; user MAC address; user credit-, debit-, or charge-card number; user social security number; user driver license number; user passport number; user birthdate; user record locator; user transaction datetime; product or service purchased by user; purchase quantity; purchase price; purchase location; or merchant ID.

End of Definitions

According to some embodiments, the present technology is provided to augment identifying information obtained from one channel in a metanetwork with supplemental identifying information obtained from other channels in the metanetwork.

Enabling built-in MAC features to meet required standards is often difficult, especially with respect to implementation time, development costs, developer availability, or the proprietary nature of the unmet needs. Moreover, using built-in MAC features may directly hinder the performance of the essential service (underlying network), or may alter it in a way that distorts the analysis and causes the service to malfunction as a result of misguided control. For these and other reasons, it is often desirable to employ a third-party system designed expressly for monitoring, analyzing, and controlling the operation and communications of a network service, irrespective of the existence of any MAC features already built into that service.

Likewise, while an individual network service may provide an interface to facilitate third-party white-box monitoring, analysis, and control of its operation and associated network traffic, that interface may nevertheless not be designed to provide the access required for specific MAC tasks. In some instances, third-party MAC systems may not function as designed, or may be inadequately documented. In principle, such shortcomings may be overcome by reverse-engineering the service sufficiently to intrusively monitor, analyze, and control its internal operations. However, this grey-box approach may be legally proscribed in some jurisdictions. Additionally, the costs of reverse engineering may not only be prohibitively high, but are likely to recur each time the service is updated or upgraded.

Moreover, using either a supplied MAC interface or an intrusive MAC system may degrade or otherwise change the performance of the essential service, just as with a built-in MAC system. In some instances, control of a network service's operation may be accomplished via SNMP (Simple Network Management Protocol).

Notwithstanding the above, the monitoring, analysis, and control facilities available for a particular network service, whether provided with the service or by a third party, often fail to identify users, resources, or other network actors or interfaces in terms directly and immediately recognizable, interpretable, or actionable by specialized personnel or autonomous agents in fields. These agents may include security, fraud, operations, or marketing personnel.

With regard to identifying end users, user-identifying data accessible to a particular monitor may often be confined to indirect indicators like anonymous IP addresses, ephemeral session IDs, inscrutable GUIDs, arbitrary nicknames, credit card numbers, social security numbers, drivers' license numbers, or other personal identification numbers, or other handles not obviously related to nor readily associable with the users' actual names, account names, organizational affiliations, email addresses, telephone numbers, postal addresses, physical addresses, or other identifying or contact information (or vice versa) that may be needed to properly evaluate and remediate actions by the users concerned.

Moreover, what little indirect identifying information is accessible may be further obscured by encryption, hashing, tokenizing, and similar processes for reasons of privacy, security, and performance. In such cases, integrating a third-party stand-alone system for monitoring, analysis and control is hampered to the same degree by the same considerations, notwithstanding such additional impetus to overcome those obstacles as might be provided by the integration effort.

According to some embodiments, it is often desirable to employ a stand-alone system (e.g., an AMAC or IMAC) designed for unobtrusive black-box monitoring, analysis, and control of services and networks (e.g., multi-service multi-network systems) by evaluating input, output, and resource usage. Advantageously, is some embodiments the present technology may not require built-in interfaces or intrusive access into the service/system, although in some instances acceptable levels of intrusiveness may be allowed. Additionally, in some embodiments, various interfaces may be implemented that allow end users to view various monitoring, analysis, and or control aspects of a network, such as a metanetwork.

Unobtrusive monitoring of a network service's input and output may be accomplished by tapping the network to obtain a copy of its input and output traffic. Tapping may occur at various points within the network, especially within metanetworks that include multiple networks (e.g., extranets, intranets, and so forth) and/or multiple services. Tapping may be accomplished in a number of ways, using network facilities such as address resolvers, hubs, (amalgamating) switches, bridges, or dedicated taps.

According to some embodiments, communications between a network service and other applications (e.g., messages) may be tapped by modifying address resolvers. An address resolver can be manipulated to cause a service to communicate with a monitor instead of, or in addition to, a DNS (Domain Name System) server on the Internet or an ARP (Address Resolution Protocol) server on a LAN (local area network). In various embodiments, dedicated network-tap devices may be installed in various network segments used by the service to obtain a copy of its traffic.

In some exemplary embodiments, port-mirroring or broadcasting capabilities of switches and routers, which are connected to the network segments, may be used to copy traffic. In some embodiments, the present technology may spoof the service to divert, intercept, and forward traffic, for example by DNS (Domain Name System) server poisoning or IP address spoofing on the Internet, ARP (Address Resolution Protocol) server poisoning, and MAC (Media Access Control) address spoofing on a local area network—just to name a few. It is noteworthy that interception methods may often be accomplished without adding or reconfiguring hardware or software, but these interception methods may pose security risks, inevitably introduce delays in the traffic to and from the service, and, depending on the network topology, may also throttle communication with the service by increasing the overall network traffic.

Broadcasting from a hub (which requires no configuration) or from a router (configured to promiscuous mode) reduces network throughput under heavy traffic due to packet collisions. This is a problem especially with Ethernet hubs, which have not kept up with network speed improvements as they are no longer manufactured.

Port-minoring, also known as port monitoring, may include but is not limited to SPAN (Switched Port Analyzer), RAV (Roving Analysis Port), LMP (Link-Mode Port), or VACL (VLAN Access Control List) on a VLAN (Virtual Local Area Network). These port-minoring techniques may require no hardware alterations for switches already on the relevant network segments, but may require software configuration, and may, under heavy traffic, depending on the design of the switch or router, either throttle the server's traffic or fail to copy all of it to the monitor. Dedicated network taps offer unimpeded pass through and full copying of the network traffic once installed, but may interrupt service during installation.

It is envisioned that the present technology may allow for querying one or more databases or correlating the results of monitoring and analyzing other network services to associate data from one monitor with the further information required to recognize actors or resources, interpret and evaluate their actions or usage, and respond appropriately. To avoid such integration barriers, it would be advantageous for a network monitoring, analysis, and control system to be able to evaluate the flow of traffic within a network, such as a multi-service and multi-network system, also referred to as a metanetwork. Thus, it would be advantageous for a network security system to monitor all traffic bidirectionally between the network and its clients and partners, as well as all internal traffic, and combine the information in order to correlate all useful identifying information logically, temporally, and statistically.

Evaluations of the traffic may be used to detect or estimate traffic latency within the network. Additionally, the traffic may be analyzed to detect fraudulent activity within the network. In some embodiments, the traffic analysis data may be stored in transaction logs and/or utilized for marketing purposes. In some embodiments, the present technology may also extract results from database session data and associate them with website session data.

These and other advantages of the present technology will be described in greater detail with reference to the drawings.

FIG. 1 is a data-flow diagram of an apposed metanetwork traffic-monitoring, correlative-analysis, and service-control (AMAC) system, hereinafter system 1000. According to some embodiments, the system 1000 nonintercessorily taps Internet, intranet, and extranet traffic within a metanetwork 100.

Generally, the metanetwork 100 includes services such as the Internet, an intranet, and an extranet. Each of these services may be facilitated by various servers as will be described in greater detail below.

According to various embodiments, the metanetwork 100 comprises a client (not shown), which may comprise any end user computing system such as a personal computer, laptop, tablet, and so forth. The metanetwork 100 may also comprise an Internet traffic bidirectional tap ("bitap") 1070 that monitors one or more internet networks, such as internet network 1010 other public network. The internet network 1010 may be facilitated by one or more Internet nodes 1040, also referred to as Internet "servers". An Internet server 1040 may comprise any server that is configured to provide access to the Internet for the client.

An internet traffic bitap 1070 (or multiple bitaps) is disposed between and communicatively coupled with both an internet node 1040 and an intranet node 1050. Again, the metanetwork may comprise a plurality of internet nodes and/or intranet nodes.

The metanetwork 100 may also comprise one or more external nodes, such as external node 1060, which may be communicatively coupled with one or more extranet networks, such as extranet network 1030. An extranet traffic bitap 1090 is disposed between and communicatively coupled with both the external node 1060 and the extranet network 1090, as well as the intranet node 1050. An intranet traffic bitap 1080 is disposed between and communicatively coupled with both the intranet node 1050 and a metanetwork traffic monitor 1100, hereinafter "monitor 1100." Again, the metanetwork 100 may comprise a plurality of the various internal and/or external nodes shown in FIG. 1. Additionally, the metanetwork 100 may comprise various combinations of intranet and internet bitaps which may be communicatively coupled with other bitaps or the various nodes of the metanetwork 100.

The Internet traffic bitap 1070 and the extranet traffic bitap 1090 are also communicatively coupled with the metanetwork traffic monitor 1100. Additional intranet traffic bitaps 1080 may be disposed between and communicatively coupled with the intranet node 1050 and the metanetwork traffic monitor 1100.

The system 1000 may also have a correlative network traffic analyzer, hereinafter "analyzer 1110," and a network service controller, hereinafter "controller 1120." It is noteworthy that the executable instructions may include additional components, modules, engines, and so forth, and still fall within the scope of the present technology. As used herein, the terms "module," "analyzer," "engine," "monitor," and "controller" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules may include separately configured web servers. Also, the components of the system 1000 may be provisioned with a cloud.

Figure 25:
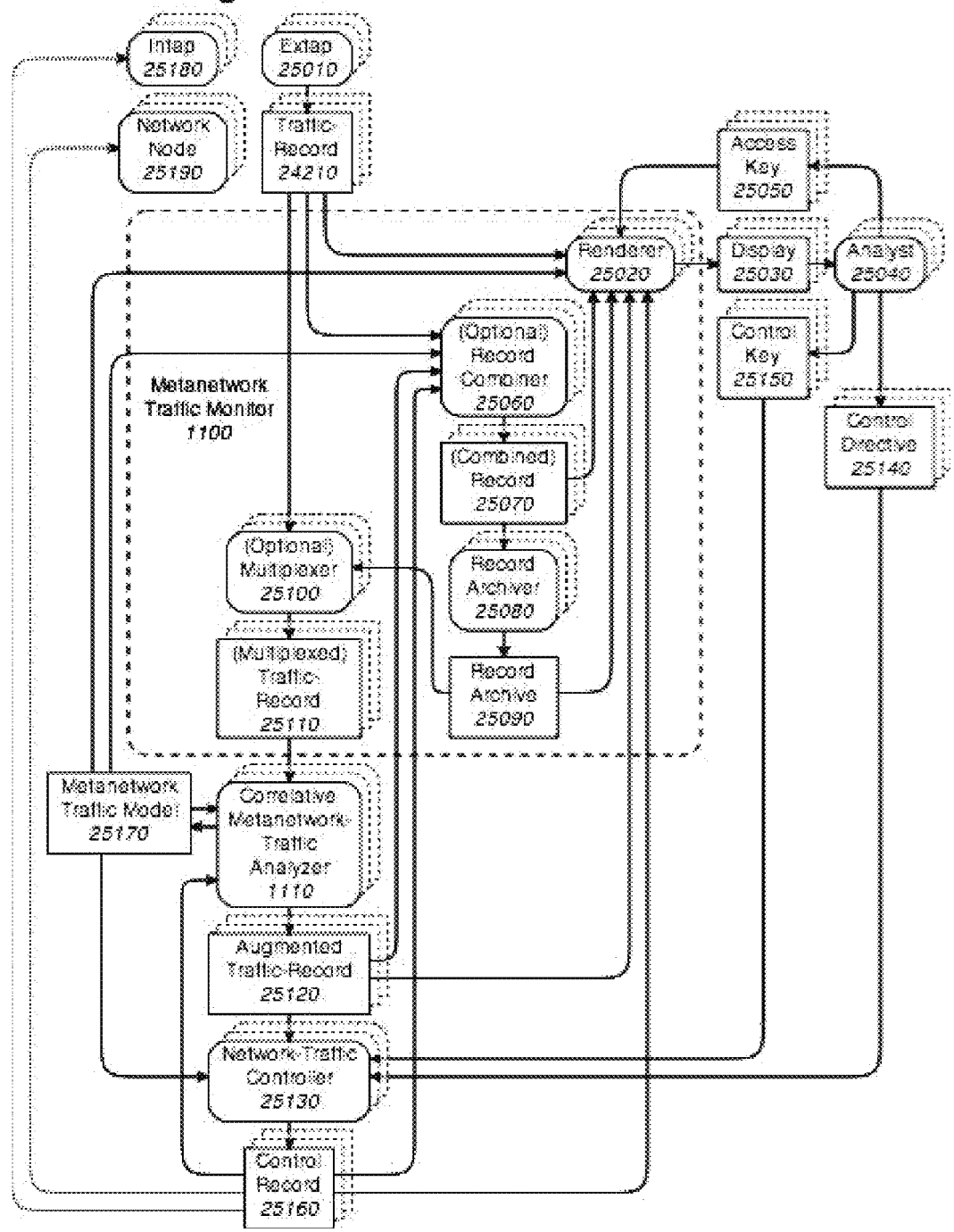
FIG. 25 is an information-flow diagram of a metanetwork traffic monitor.

Generally, the monitor 1100 may receive traffic records from the various bitaps associated with the metanetwork 100. The bitaps may be associated with the metanetwork in either an apposed or interposed manner. Apposed association may be understood to mean that the system 1000 may be associated with the metanetwork 100 without directly impeding any of the preexisting traffic of the metanetwork 100. Interposed association may be understood to mean that the system 1000 may be associated with the metanetwork 100 so as to mediate all traffic between two or more of its preexisting subsystems (e.g., servers, services, etc.). This type of association may impede preexisting traffic, at least to some degree. FIGS. 1 and 25 collectively illustrate an exemplary monitor 1100 which receives traffic records from one or more exemplary bitaps.

In some embodiments, the intranet servers 1050 may include application servers and database servers, while the extranet servers 1060 may include fraud-solutions servers, payment servers, database servers, aggregation servers, and common collection-point servers.

In the metanetwork 100 of FIG. 1, the controller 1120 may be utilized to control the flow of traffic through any of the Internet server 1050, the intranet server 1060, the intranet server 1070, and/or the extranet server 1080. The controller 1120 may utilize the various outputs of the analyzer 1110 to control the flow of traffic through the aforementioned services.

After the creation of traffic records, the monitor 1100 may transmit the traffic records to the analyzer 1110, as shown in FIG. 1.

It will be understood that in the metanetworks of FIGS. 1, 3, 7, and 13, if only the traffic to a server or only the traffic from a server is to be monitored and analyzed, unidirectional taps can be used in place of bidirectional taps. In these embodiments, an apposed metanetwork monitoring, correlative analysis, and control (AMAC) system monitors the performance of a metanetwork by unobtrusively tapping its communications, but controls it by obtrusively communicating directly with its services.

Various metanetworks are described in FIGS. 2-3 and 7-23. Generally, FIGS. 1-3 and 7-13 include various metanetwork configurations in combination with AMAC systems. Contrastingly, FIGS. 14-23 include various metanetwork configurations in combination with IMAC systems.

Figure 2:
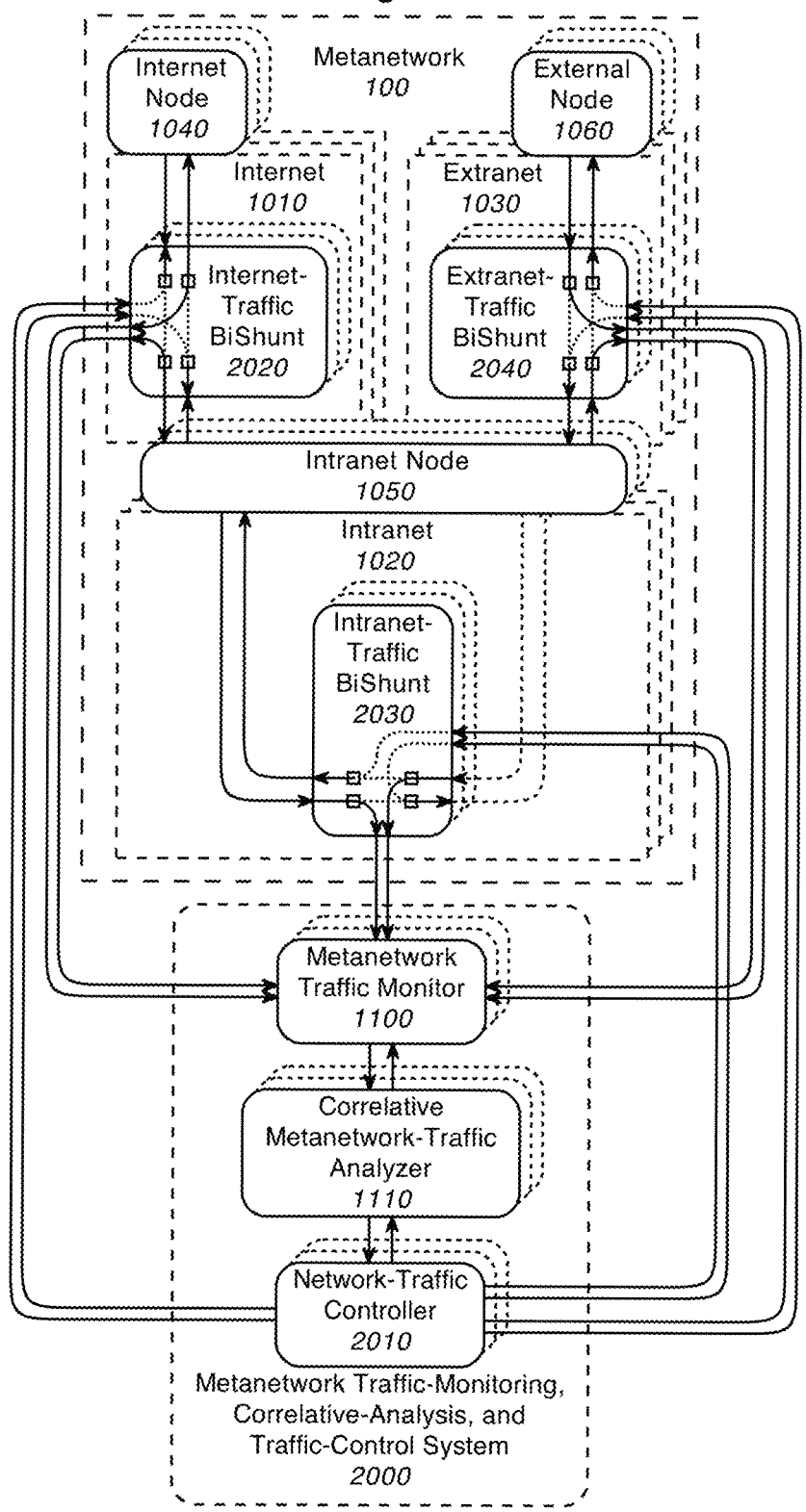
FIG. 2 is a data-flow diagram of an interposed metanetwork traffic-monitoring, correlative-analysis, and traffic-control (IMAC) system intercessorily tapping Internet, intranet, and extranet traffic.

FIG. 2 illustrates another exemplary metanetwork 200 that may be monitored, analyzed, and controlled by an exemplary interposed metanetwork traffic monitoring, correlative analysis, and traffic control (IMAC) system 2000. The metanetwork 200 is similar to the metanetwork 100 of FIG. 1. The IMAC system 2000 may intercessorily tap the various services of the metanetwork 100. The IMAC system 2000 may utilize bidirectional shunts 2100, rather than bidirectional taps, such as those in FIG. 1.

In some instances, if the traffic to a server or the traffic from a server is to be monitored, analyzed, and controlled, unidirectional shunts can be used in place of bidirectional shunts. In some instance, the IMAC system 2000 monitors and controls the performance of the metanetwork 200 by unobtrusively tapping its communications.

Figure 3:
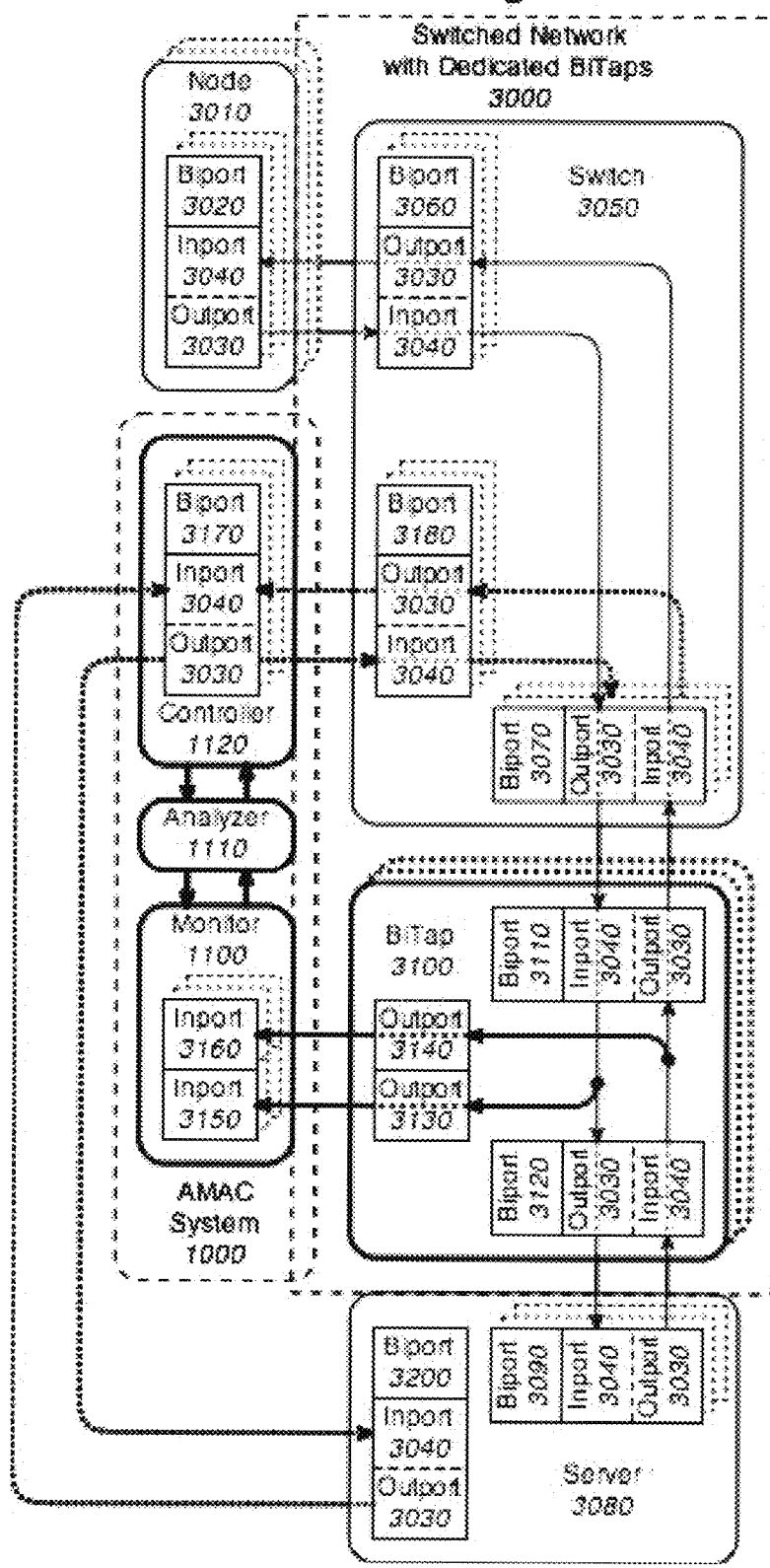
FIG. 3 is a data-flow diagram of an AMAC system using dedicated bidirectional taps to nonintercessorily tap the traffic to and from a server in a switched network.

FIG. 3 illustrates a metanetwork that includes a switched network 3000 with dedicated bidirectional taps. In FIG. 3, a separate (bidirectional) dedicated tap is utilized with each (bidirectional) port connecting a server to a switched network 3000. If the traffic to and from additional servers in a switched network is to be monitored and analyzed, a separate set of dedicated taps is required for each server in the switched network. A bidirectional tap may multiplex the two directions of traffic in a network segment to a single monitoring port (see FIG. 6). A dedicated tap may be installed at either end of a network segment or interposed anywhere along a network segment. A monitored server may be connected to a switched network with more or fewer ports than shown, or even with only one port.

In some instances, a multitap may be used in place of the set of bidirectional taps for tapping a server. Thus, the AMAC system 1000 may employ multitaps, bitaps, and unitaps, in any combination. A controller 1120 of the AMAC system 1000 may communicate with a server directly, through a switch connected to the server, or through another node ultimately connected to the server.

Figure 4:
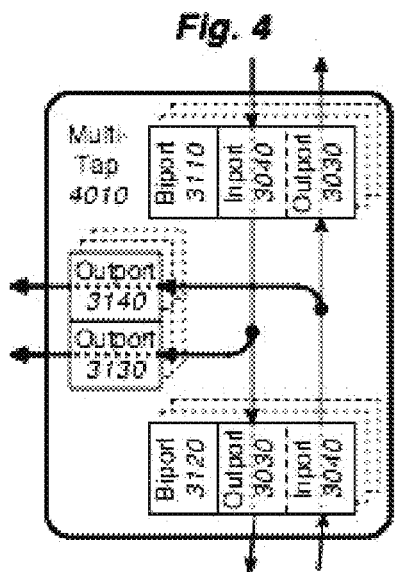
FIG. 4 is a data-flow diagram of a dedicated bidirectional multitap used in place of a set of dedicated bidirectional taps.
Figure 5:
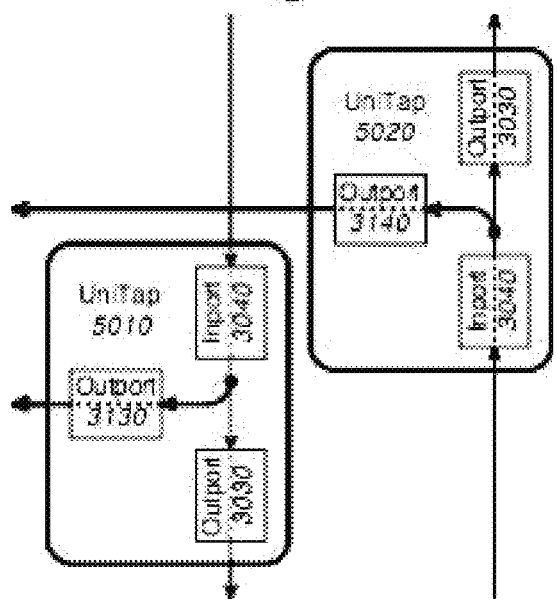
FIG. 5 is a data-flow diagram of a pair of dedicated unidirectional taps used in place of a dedicated bidirectional tap.
Figure 6:
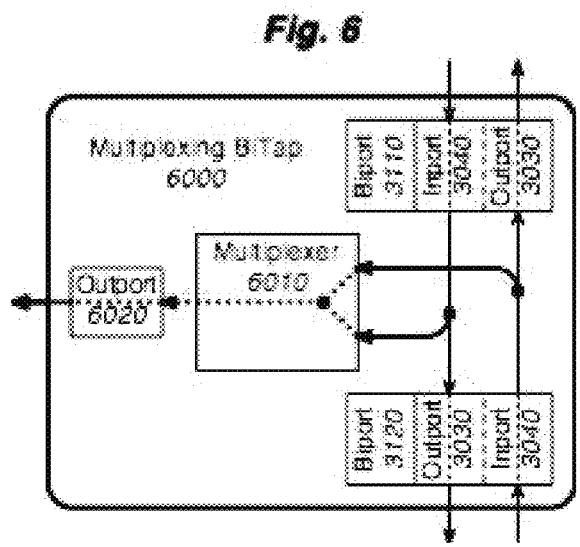
FIG. 6 is a data-flow diagram of a dedicated bidirectional tap which multiplexes the copied input and output streams into a single monitor stream.

FIGS. 4-6 illustrate various embodiments of taps which may be used in accordance with the present technology. In FIG. 4, a multitap 4010 may tap the traffic to and from more than one server. The multitap 4010 may multiplex the traffic from different directions in the same network segment and from different network segments down to fewer monitoring ports.

In FIG. 5, a bidirectional tap may be composed of two unidirectional taps, such as unitaps 5010 and 5020. In FIG. 6, a multiplexing bidirectional tap 6000 may be composed of a non-multiplexing bidirectional tap and a multiplexer. In other embodiments, tap 6000 may comprise two unidirectional taps and a multiplexer.

Figure 7:
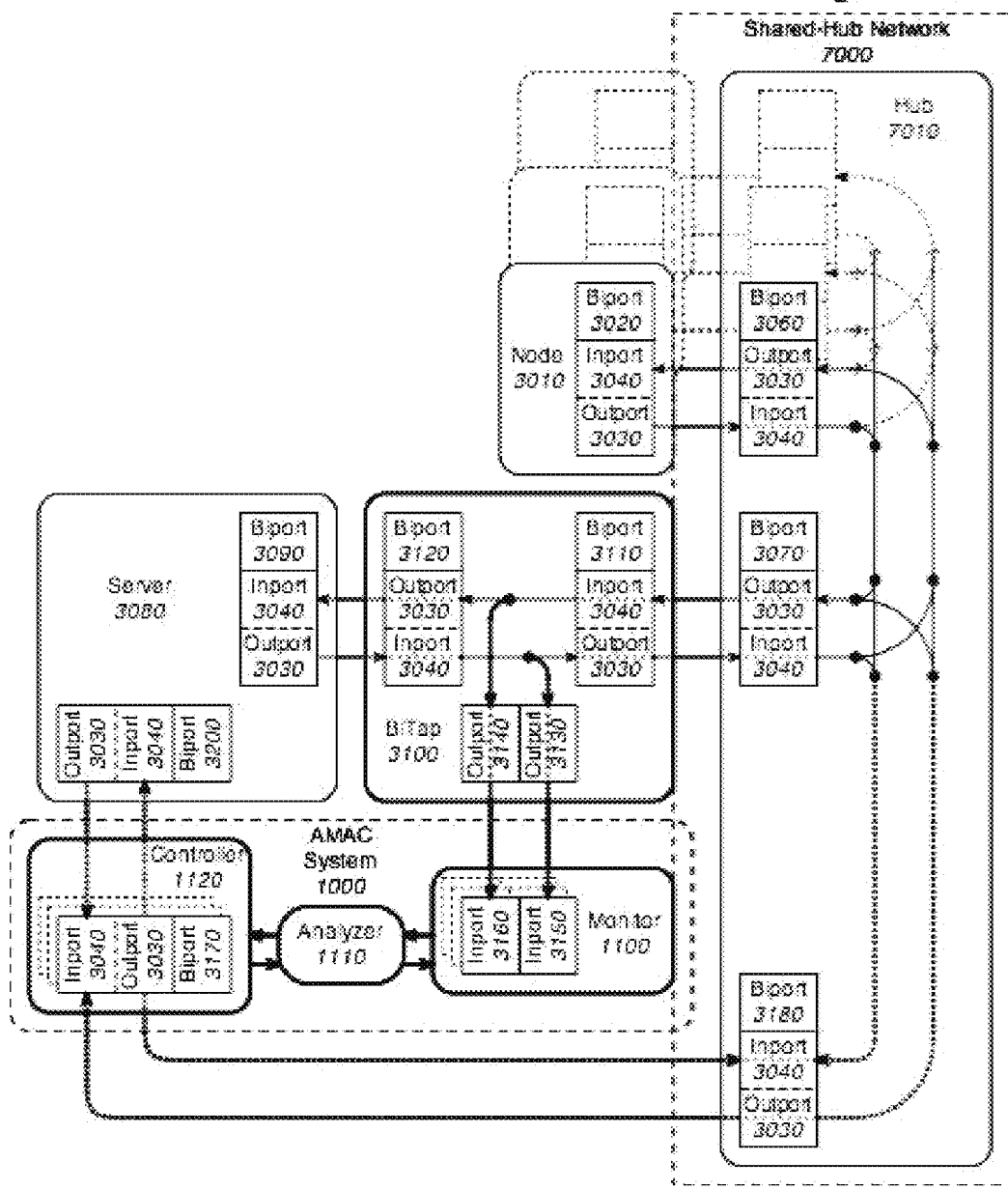
FIG. 7 is a data-flow diagram of an AMAC system using a dedicated bidirectional tap to nonintercessorily tap the traffic to and from a server in a shared-hub network.

FIG. 7 illustrates a metanetwork that comprises a shared hub network 7000. Because a hub 7010 broadcasts all traffic to all ports except the originator, connecting a monitor 1100 and analyzer 1110 to more than one port from the hub may not alleviate bandwidth limitations.

Figure 8:
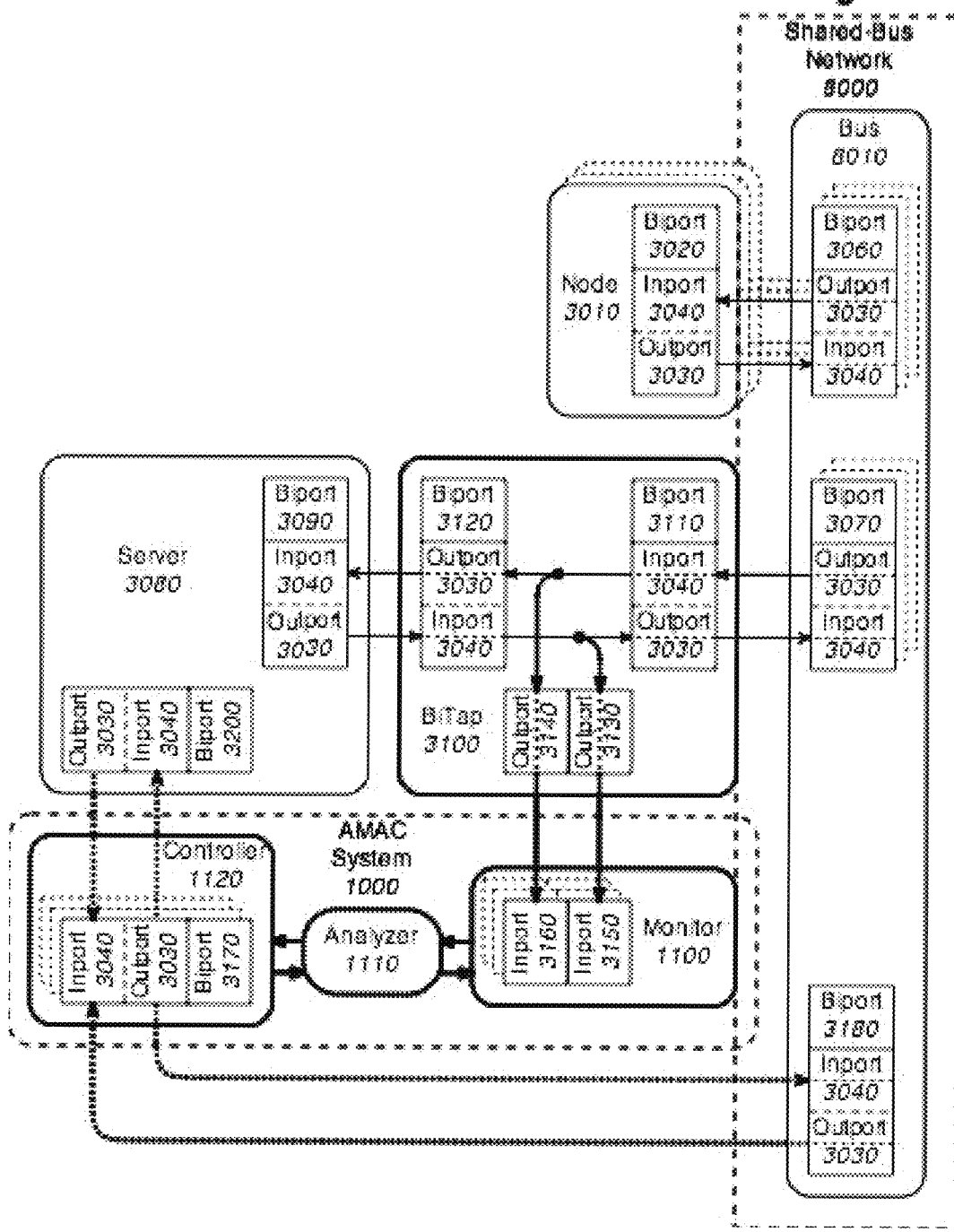
FIG. 8 is a data-flow diagram of an AMAC system using a dedicated bidirectional tap to nonintercessorily tap the traffic to and from a server in a shared-bus network.

FIG. 8 illustrates a metanetwork that comprises a shared bus network 8000. In some instances, the bus 8010 carries all traffic to all ports, connecting the monitor 1100 and analyzer 1110 to more than one port from the bus may not alleviate bandwidth limitations. It is noteworthy that a wireless network is technically a shared-bus network.

Figure 9:
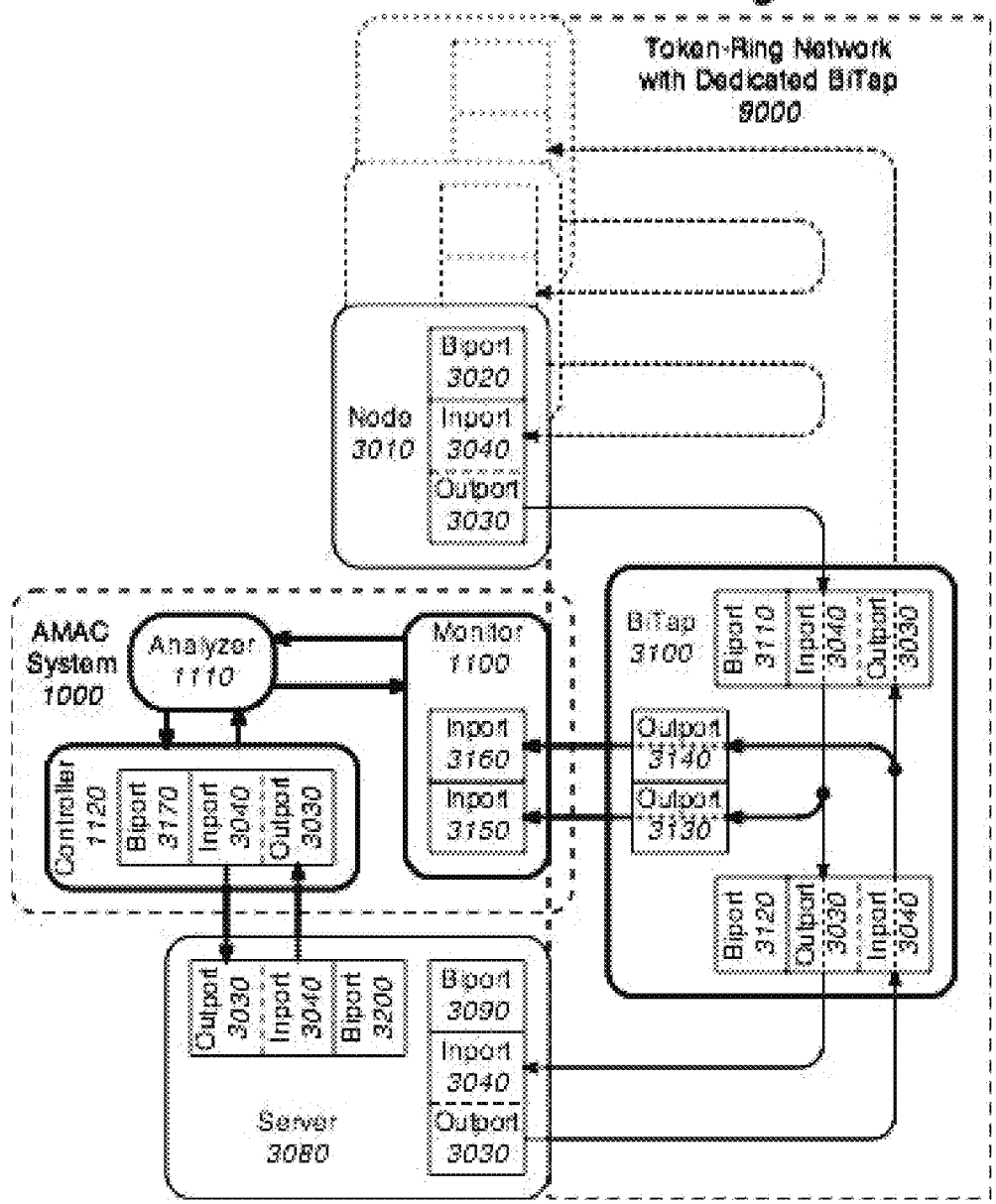
FIG. 9 is a data-flow diagram of an AMAC system using a dedicated bidirectional tap to nonintercessorily tap the traffic to and from a server in a token-ring network.

FIG. 9 illustrates a metanetwork that comprises a token-ring network 9000 with dedicated taps. A pair of unidirectional taps can be substituted for the bidirectional tap 3100 in a token-ring network. If the traffic from additional servers in a token-ring network 9000 is to be monitored and analyzed, additional taps may be required.

Figure 10:
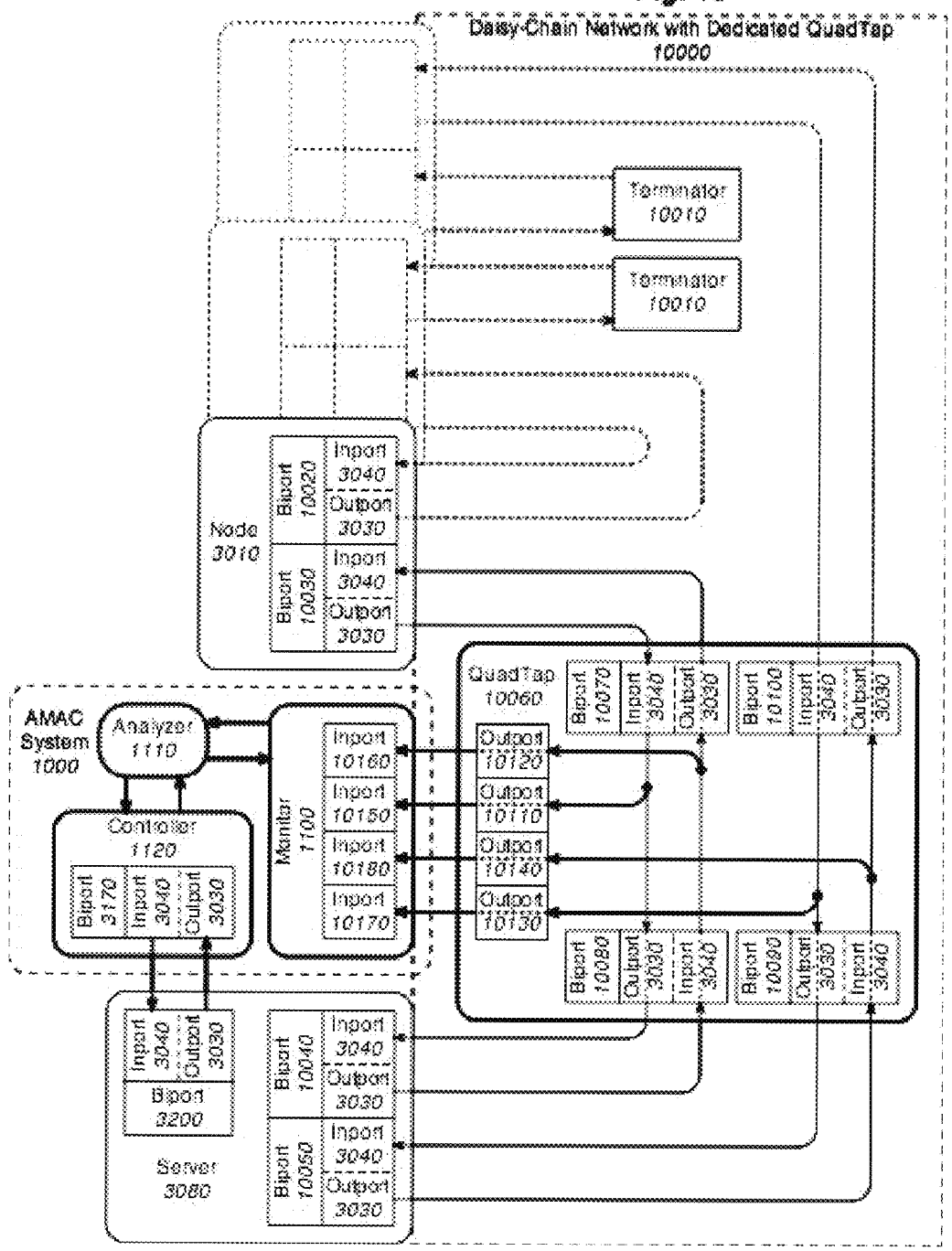
FIG. 10 is a data-flow diagram of an AMAC system using a dedicated dual bidirectional tap to nonintercessorily tap the traffic to and from a server in a daisy-chain network.

FIG. 10 illustrates a metanetwork that comprises a daisy chain network 10000. A pair of unidirectional taps can be substituted for the dual bidirectional tap (quadtap 100050) in the daisy-chain network 10000. If the traffic from additional servers in the daisy-chain network is to be monitored and analyzed, additional dedicated taps are required.

Figure 11:
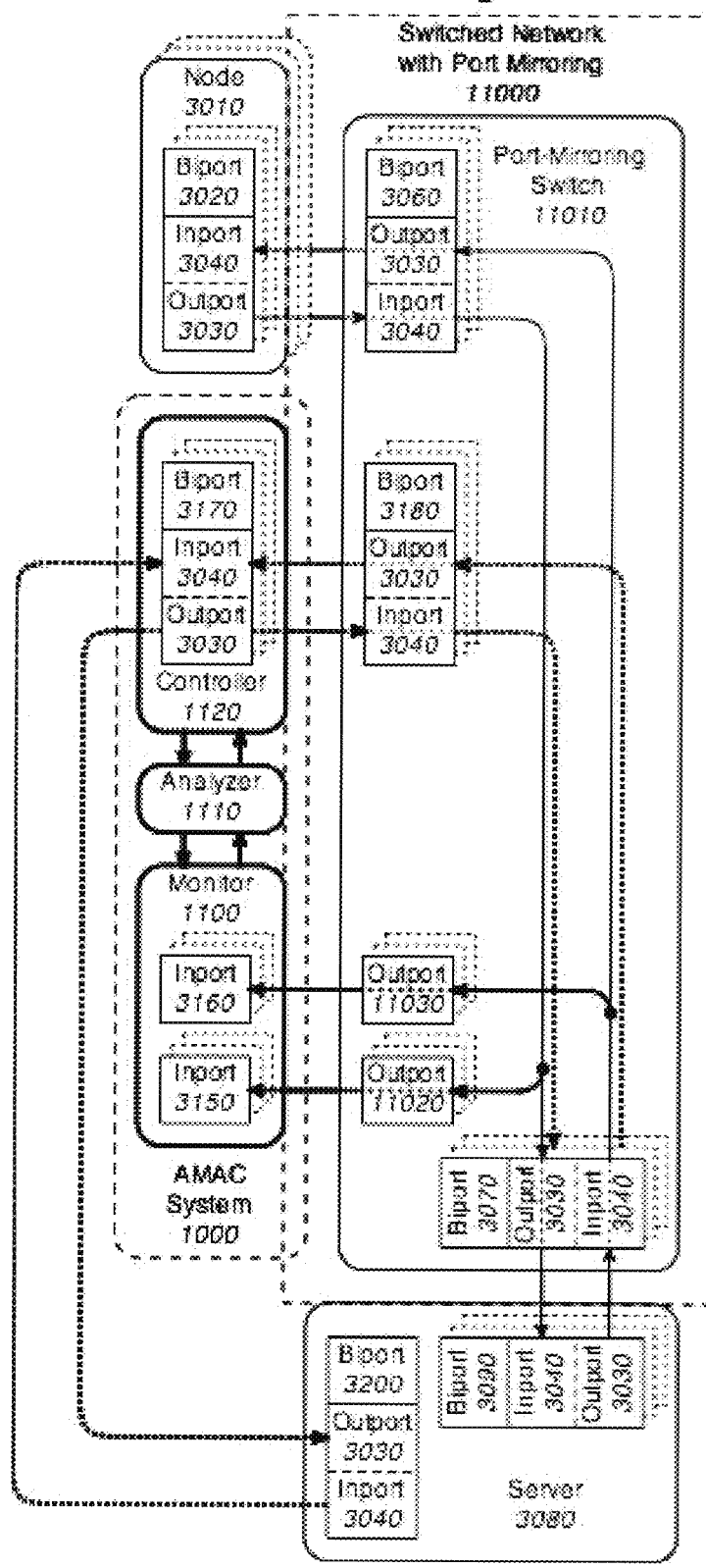
FIG. 11 is a data-flow diagram of an AMAC system using port-mirroring in the network switch to nonintercessorily tap the traffic to and from a server in a switched network.

FIG. 11 illustrates a metanetwork that comprises a switched network 11000 that utilizes port mirroring. A network switch 11010 may multiplex mirrored traffic to fewer monitoring ports. Additionally, the network switch 11010 may be a bridge connecting server ports for different network types. A server may be connected to more than one switch, in a redundant network.

Figure 12:
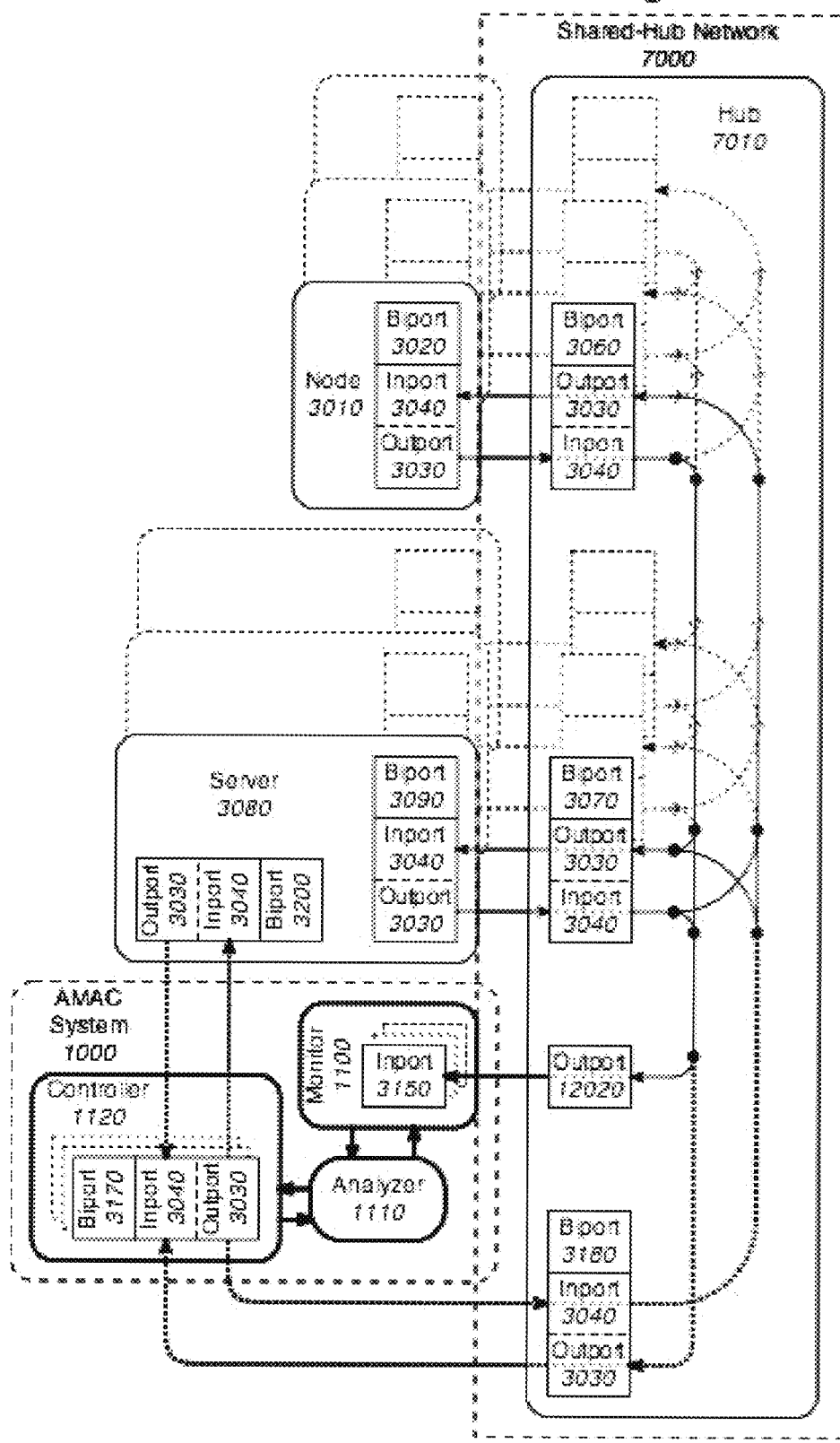
FIG. 12 is a data-flow diagram of an AMAC system apposed as a peer to nonintercessorily tap the traffic to and from a server (and all traffic on the network) in a shared-hub network.
Figure 13:
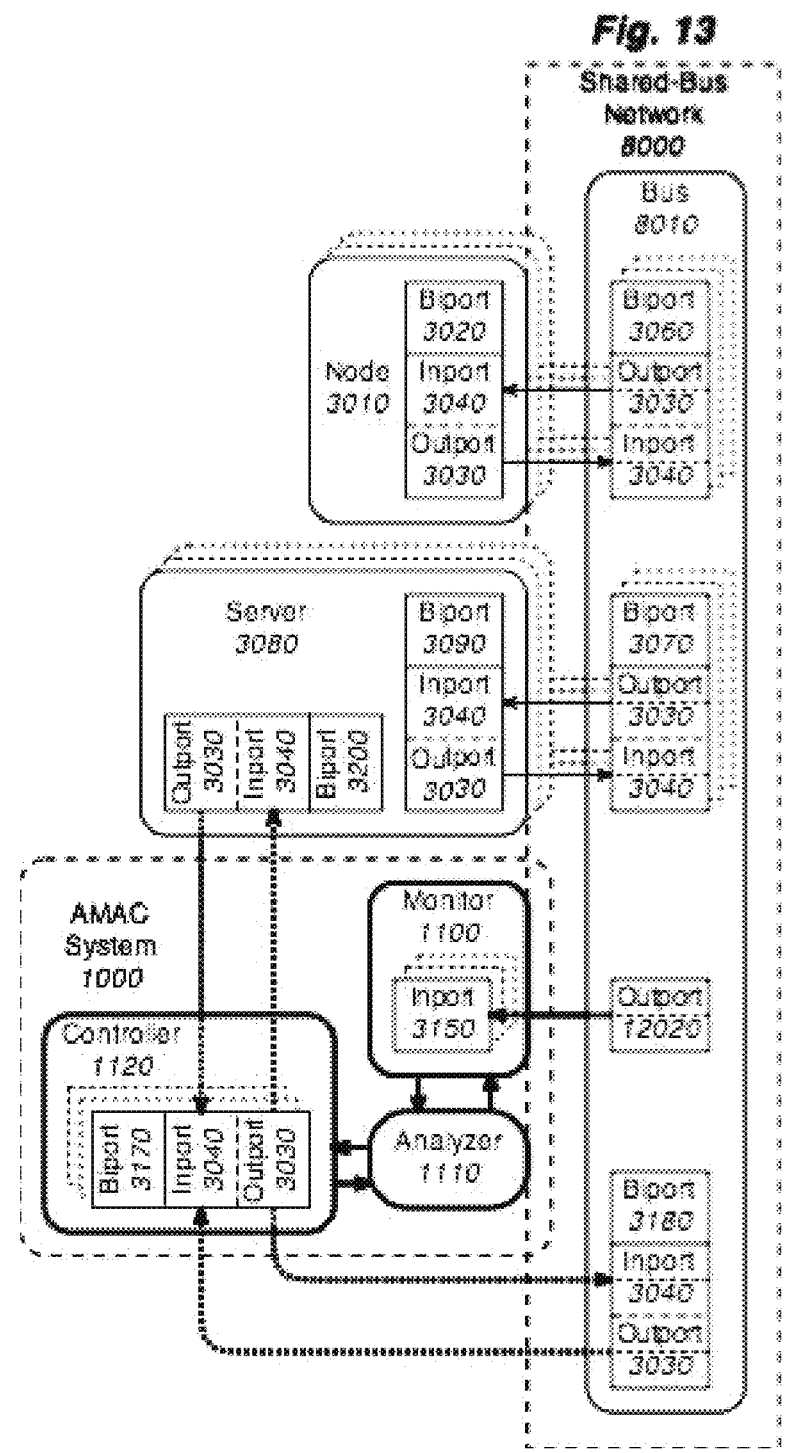
FIG. 13 is a data-flow diagram of an AMAC system apposed as a peer to nonintercessorily tap the traffic to and from a server (and the traffic on the network) in a shared-bus network.
Figure 14:
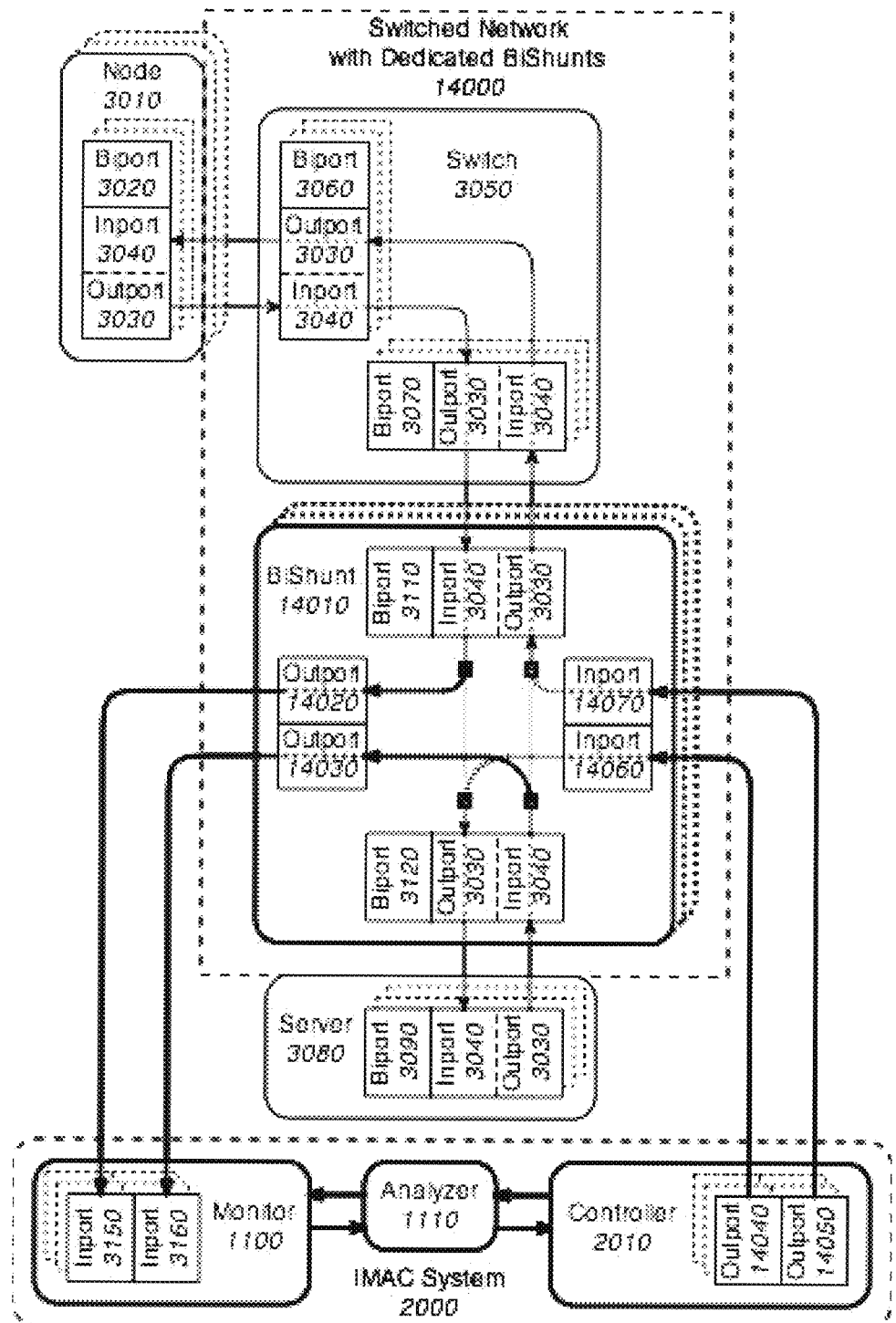
FIG. 14 is a data-flow diagram of an IMAC system using dedicated bidirectional shunts to intercessorily tap the traffic to and from a server in a switched network.
Figure 15:
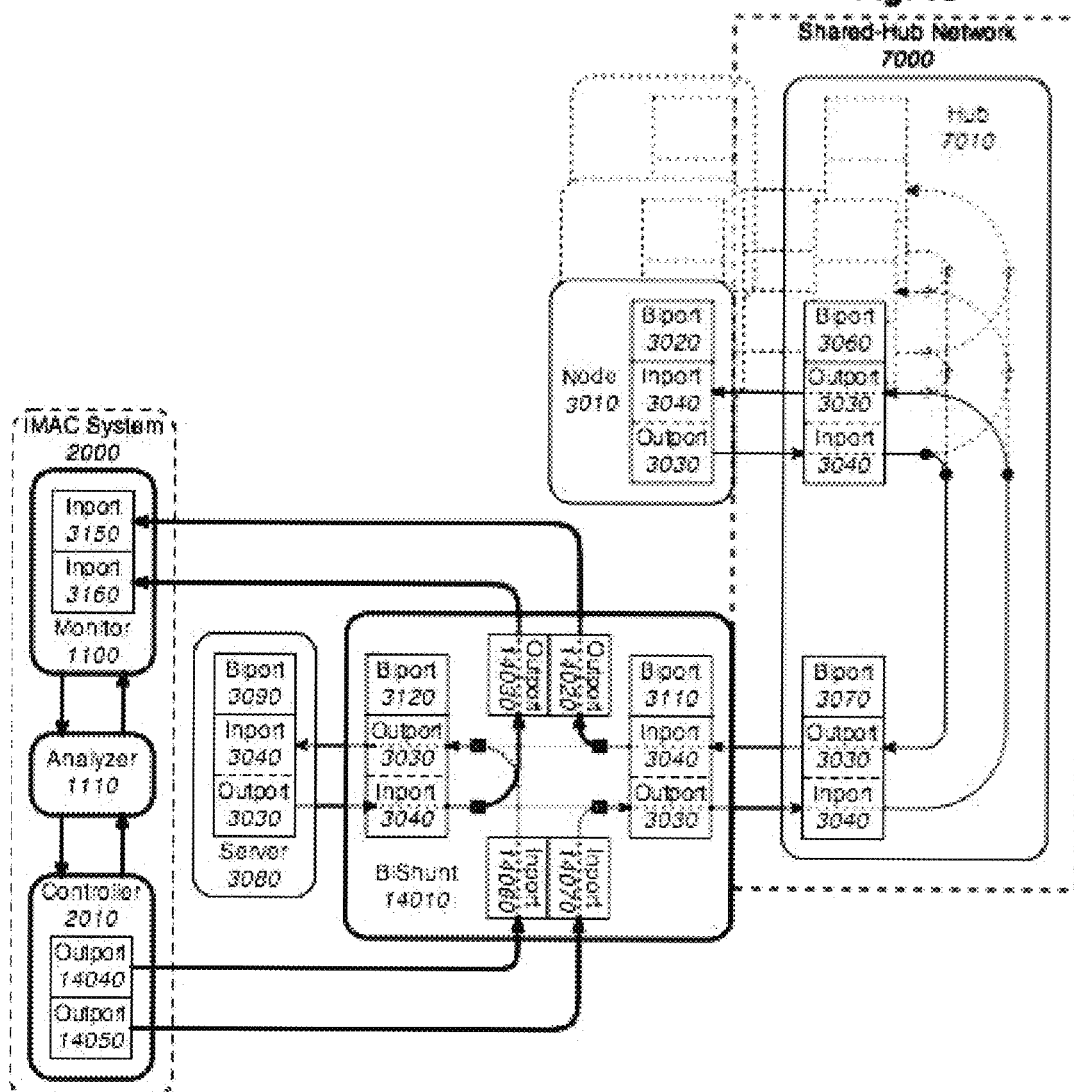
FIG. 15 is a data-flow diagram of an IMAC system using a dedicated bidirectional shunt to intercessorily tap the traffic to and from a server in a shared-hub network.
Figure 16:
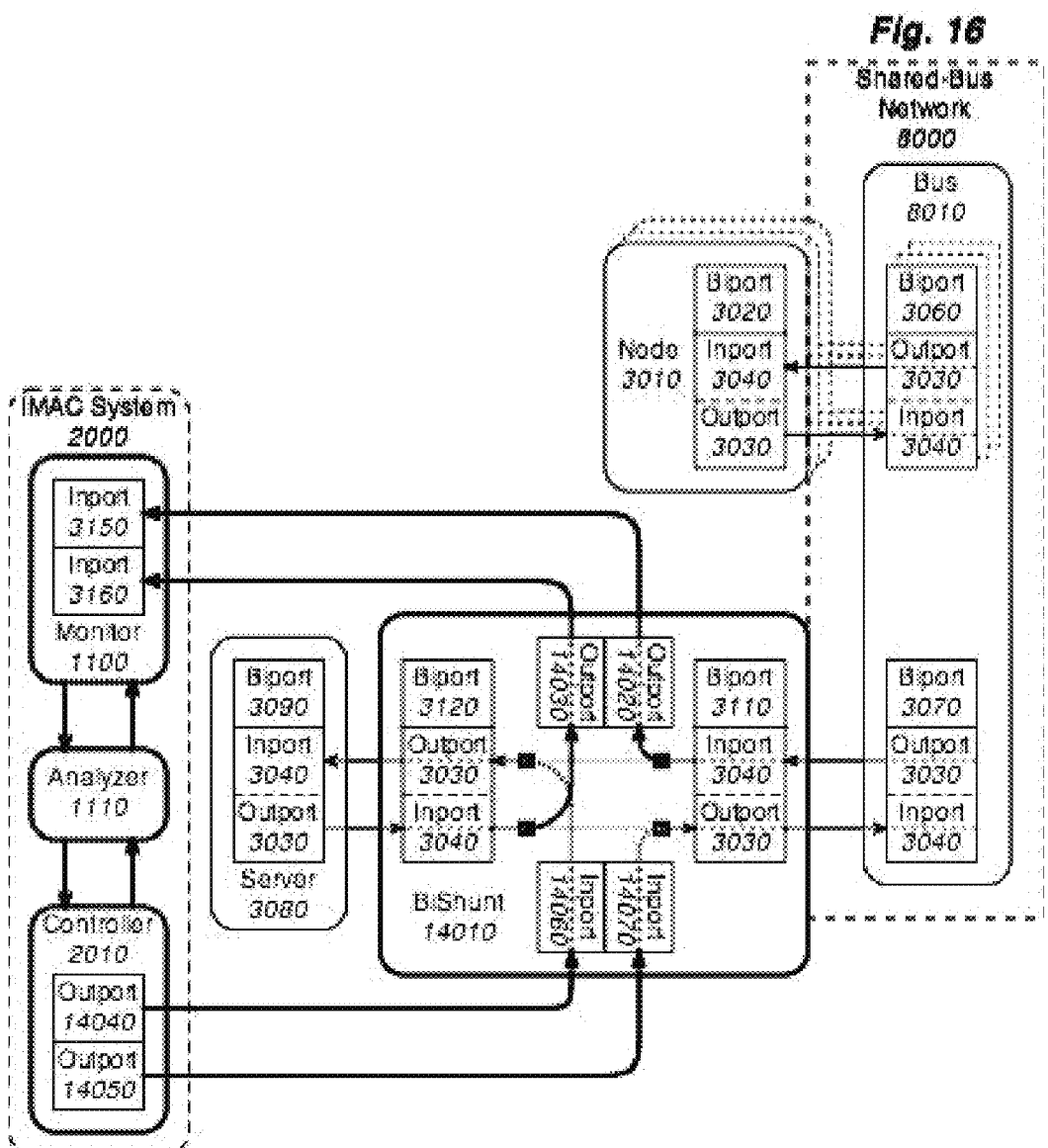
FIG. 16 is a data-flow diagram of an IMAC system using a dedicated bidirectional shunt to intercessorily tap the traffic to and from a server in a shared-bus network.
Figure 17:
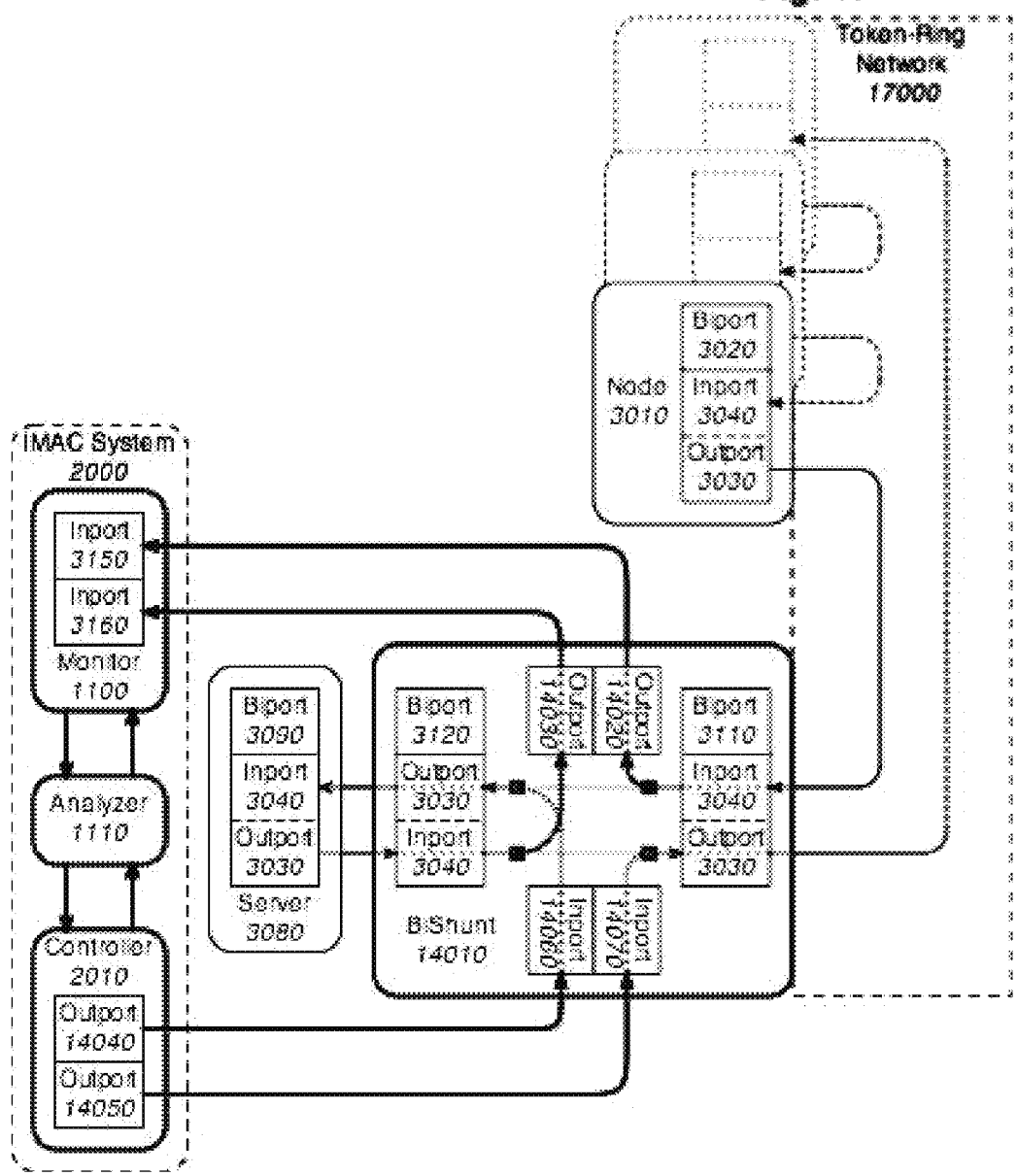
FIG. 17 is a data-flow diagram of an IMAC system using a dedicated bidirectional shunt to intercessorily tap the traffic to and from a server in a token-ring network.
Figure 18:
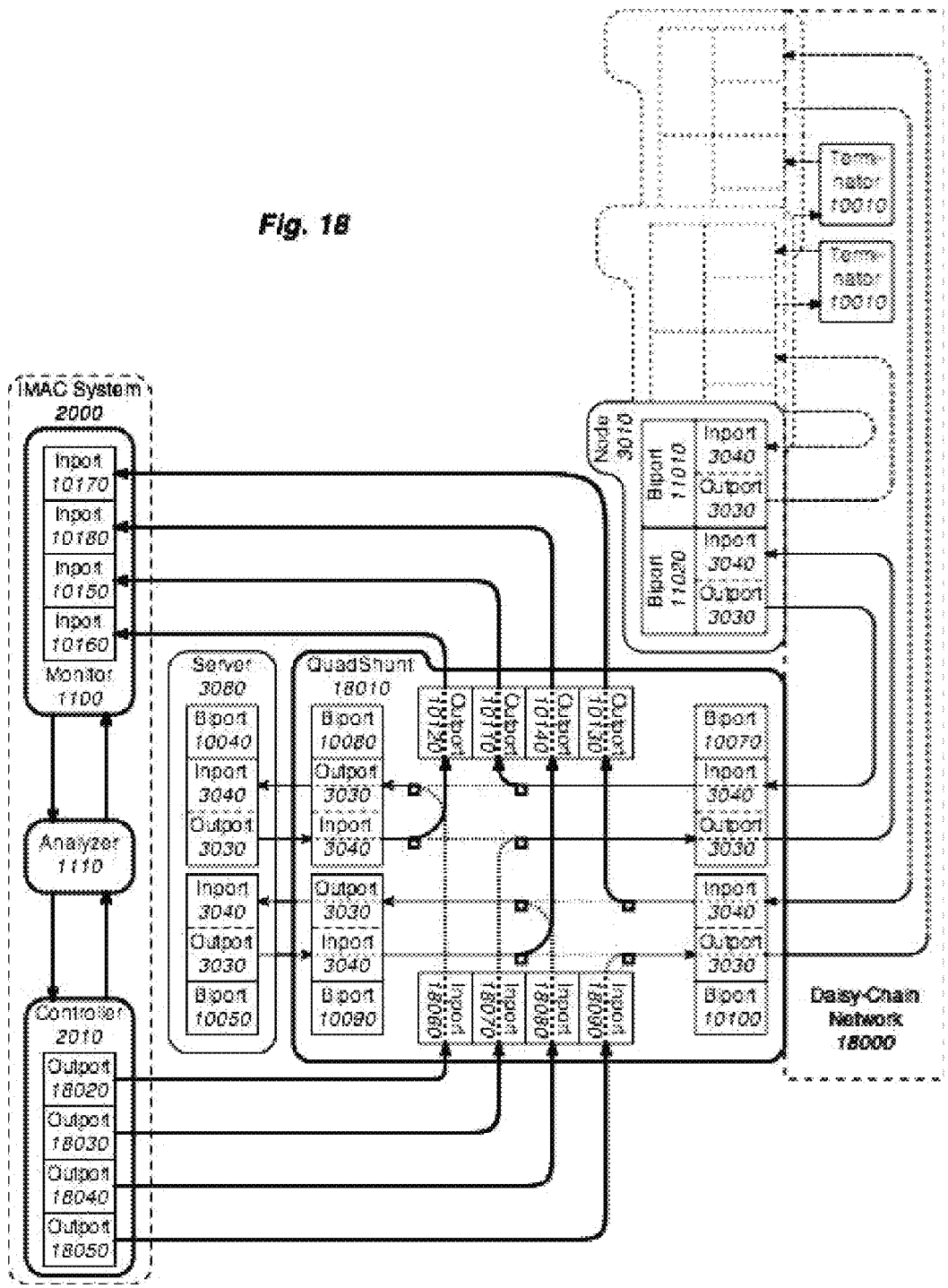
FIG. 18 is a data-flow diagram of an IMAC system using a dedicated dual bidirectional shunt to intercessorily tap the traffic to and from a server in a daisy-chain network.
Figure 19:
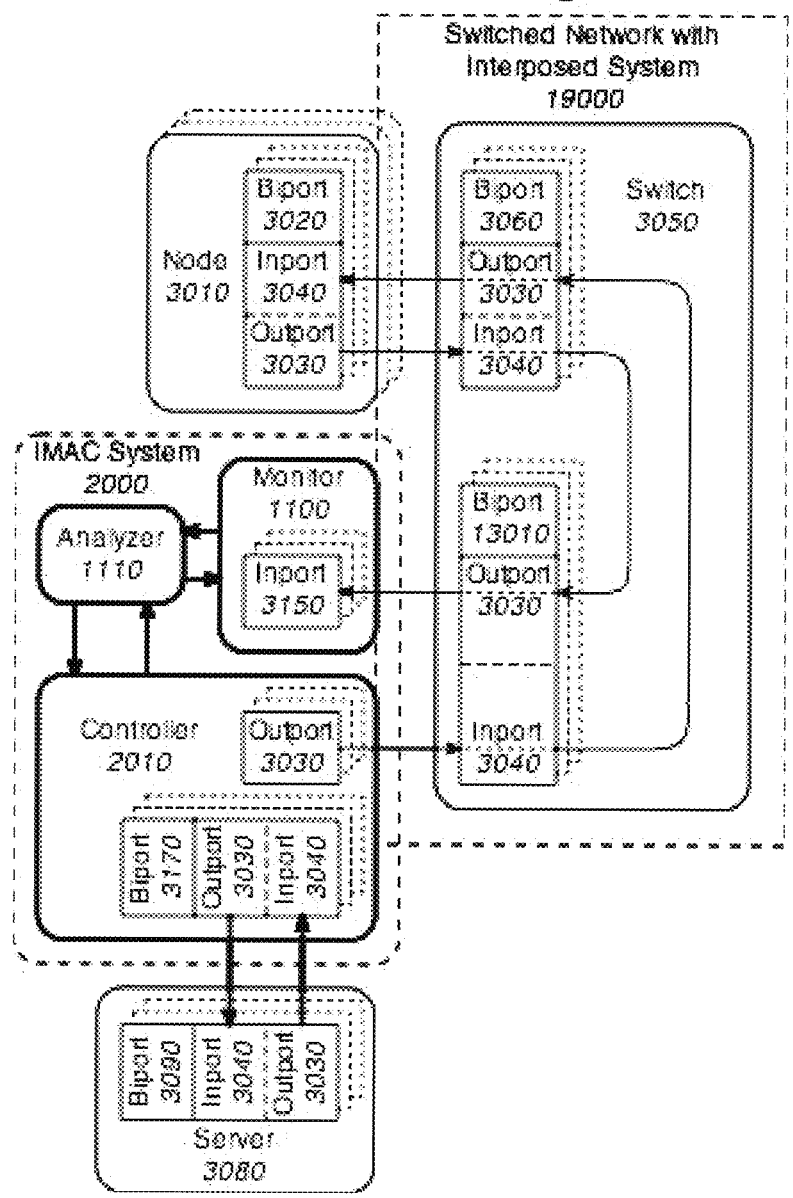
FIG. 19 is a data-flow diagram of an IMAC system directly interposed between a server and a switched network to intercessorily tap the traffic to and from the server.
Figure 20:
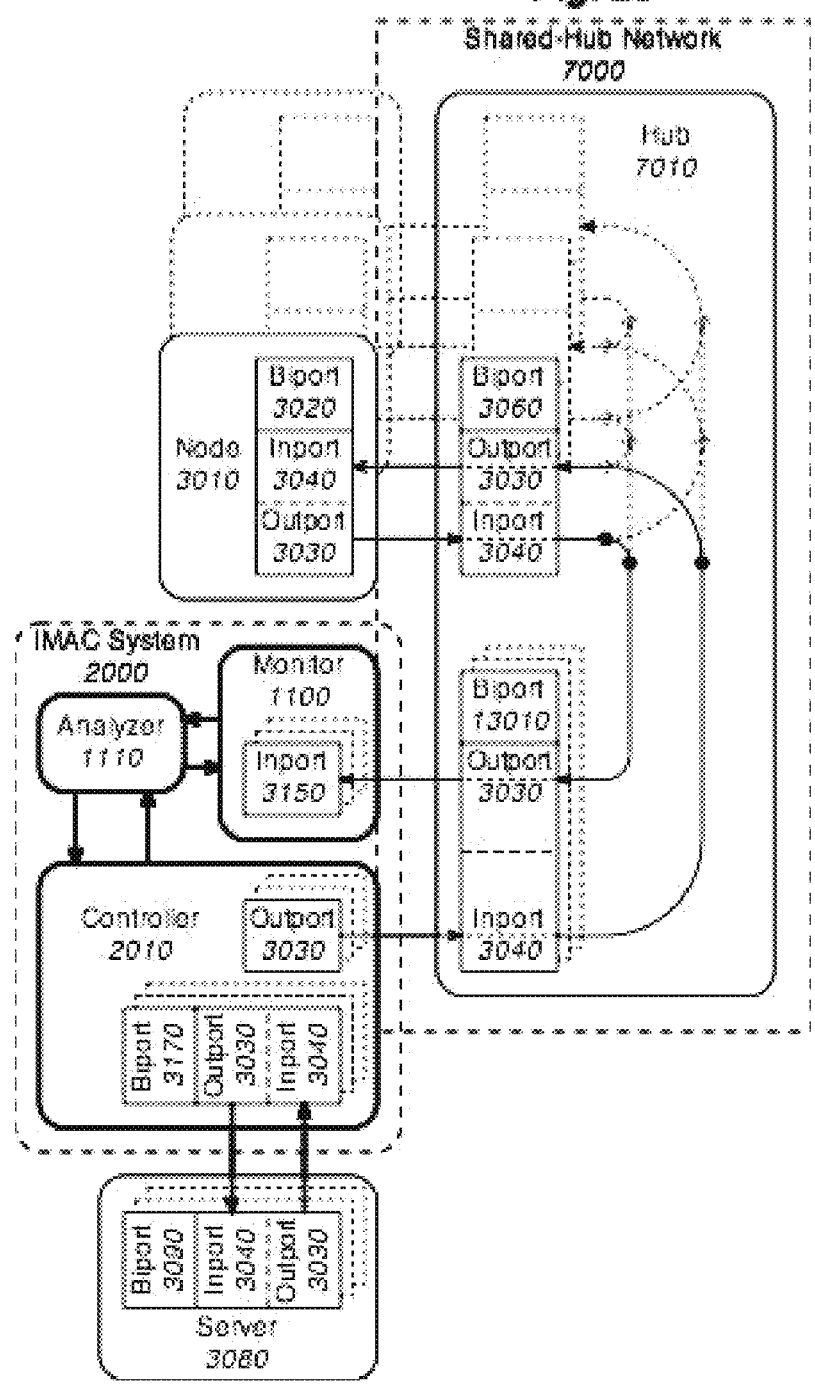
FIG. 20 is a data-flow diagram of an IMAC system directly interposed between a server and a shared-hub network to intercessorily tap the traffic to and from the server.
Figure 21:
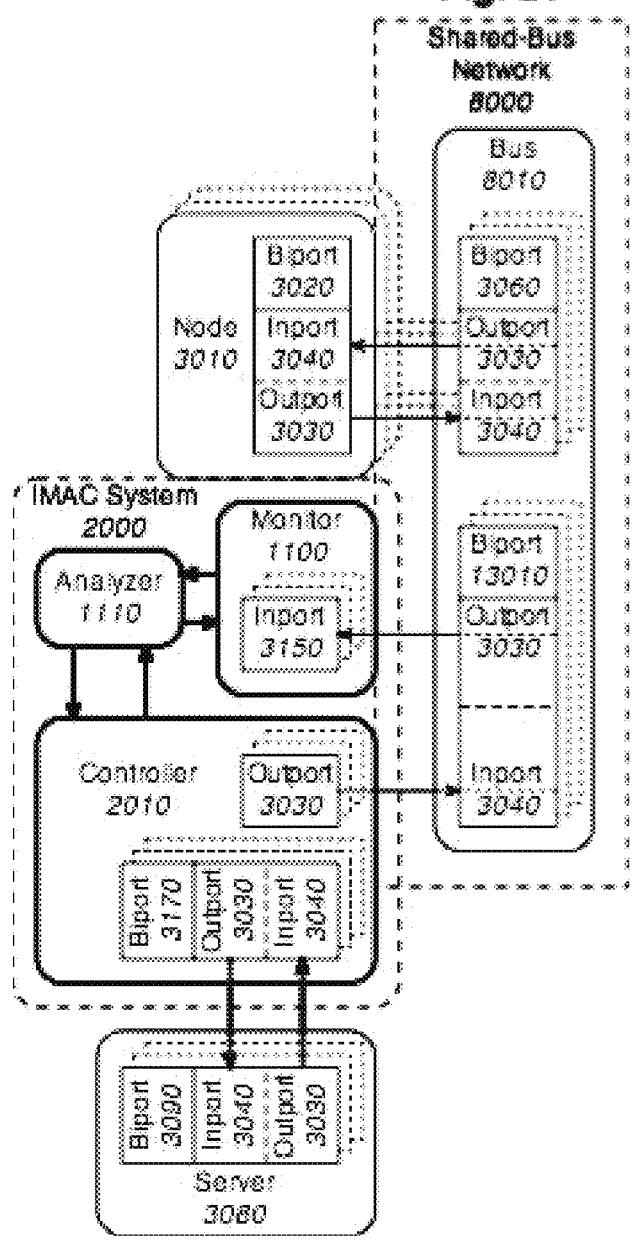
FIG. 21 is a data-flow diagram of an IMAC system directly interposed between a server and a shared-bus network to intercessorily tap the traffic to and from the server.
Figure 22:
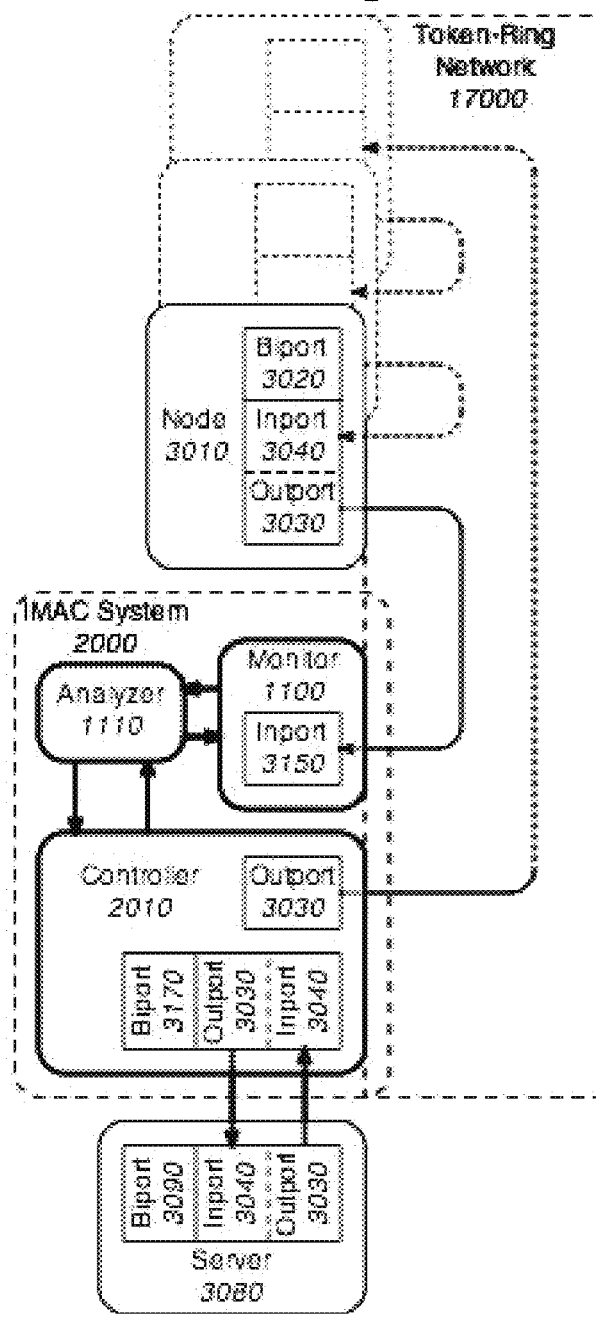
FIG. 22 is a data-flow diagram of an IMAC system directly interposed between a server and a token-ring network to intercessorily tap the traffic to and from the server.
Figure 23:
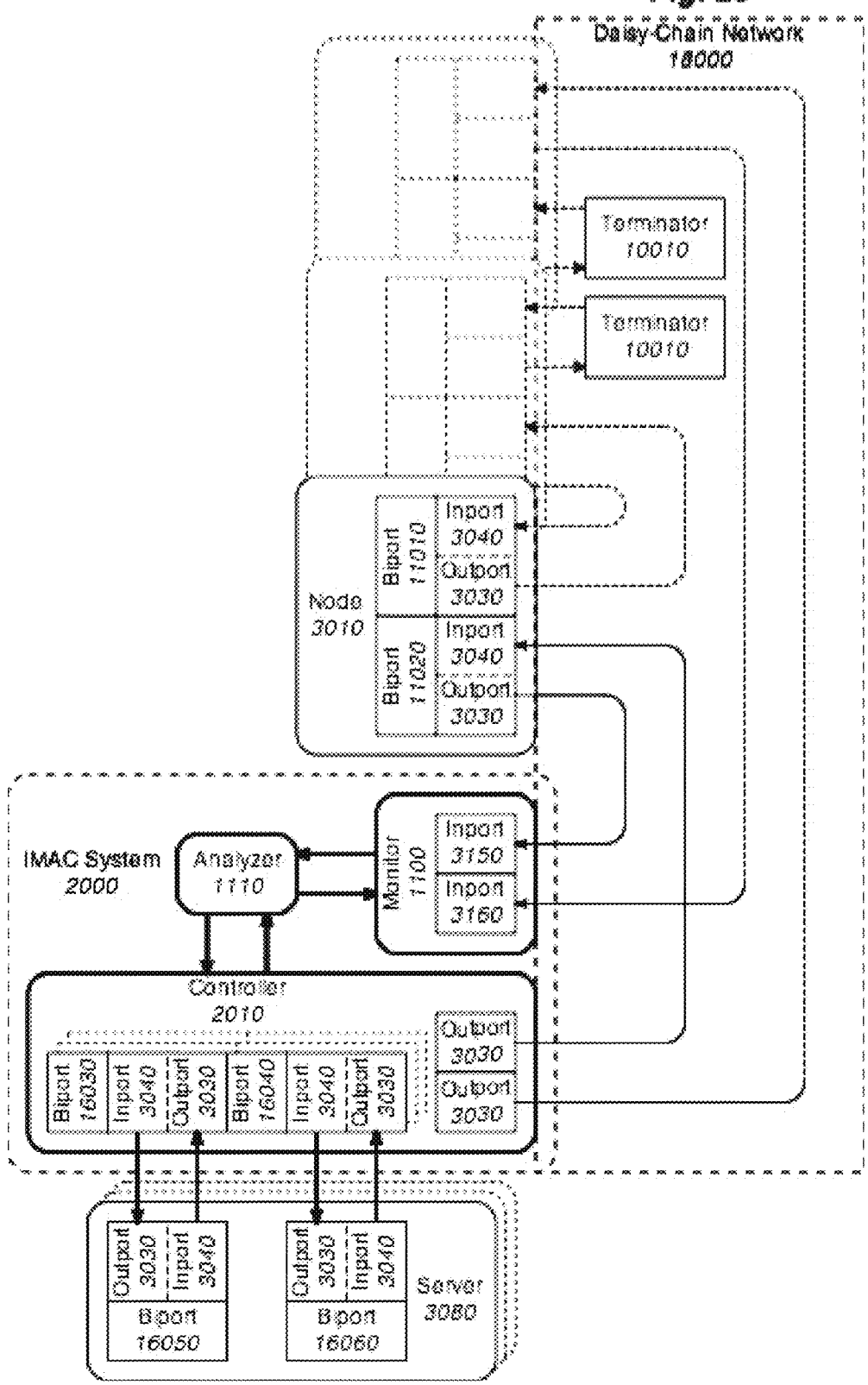
FIG. 23 is a data-flow diagram of an IMAC system directly interposed between a server and a daisy-chain network to intercessorily tap the traffic to and from the server.

FIG. 12 illustrates a metanetwork that comprises a shared hub network 7000. Because a hub 7010 broadcasts all traffic to all ports except the originator, connecting the monitor 1100 and analyzer 1110 to more than one port from the hub may not alleviate bandwidth limitations. If the traffic to and from additional servers on a hub is to be monitored and analyzed, no additional taps are required. If only the traffic to and from one or a subset of servers on a shared-hub network is to be monitored and analyzed, the monitor 1100 may filter out irrelevant traffic by its source (for traffic from targeted servers) and destination (for traffic to targeted servers).

FIGS. 13-23 each illustrate the use of an IMAC system to monitor, correlate, and control the traffic of various types of networks within a metanetwork. Generally, in order to directly control the network traffic to and from a server, rather than simply monitoring and analyzing it, intercessory taps may be utilized. Although intercessory taps make it possible to directly control network traffic, intercessory taps may also be used nonintercessorily.

Figure 24:
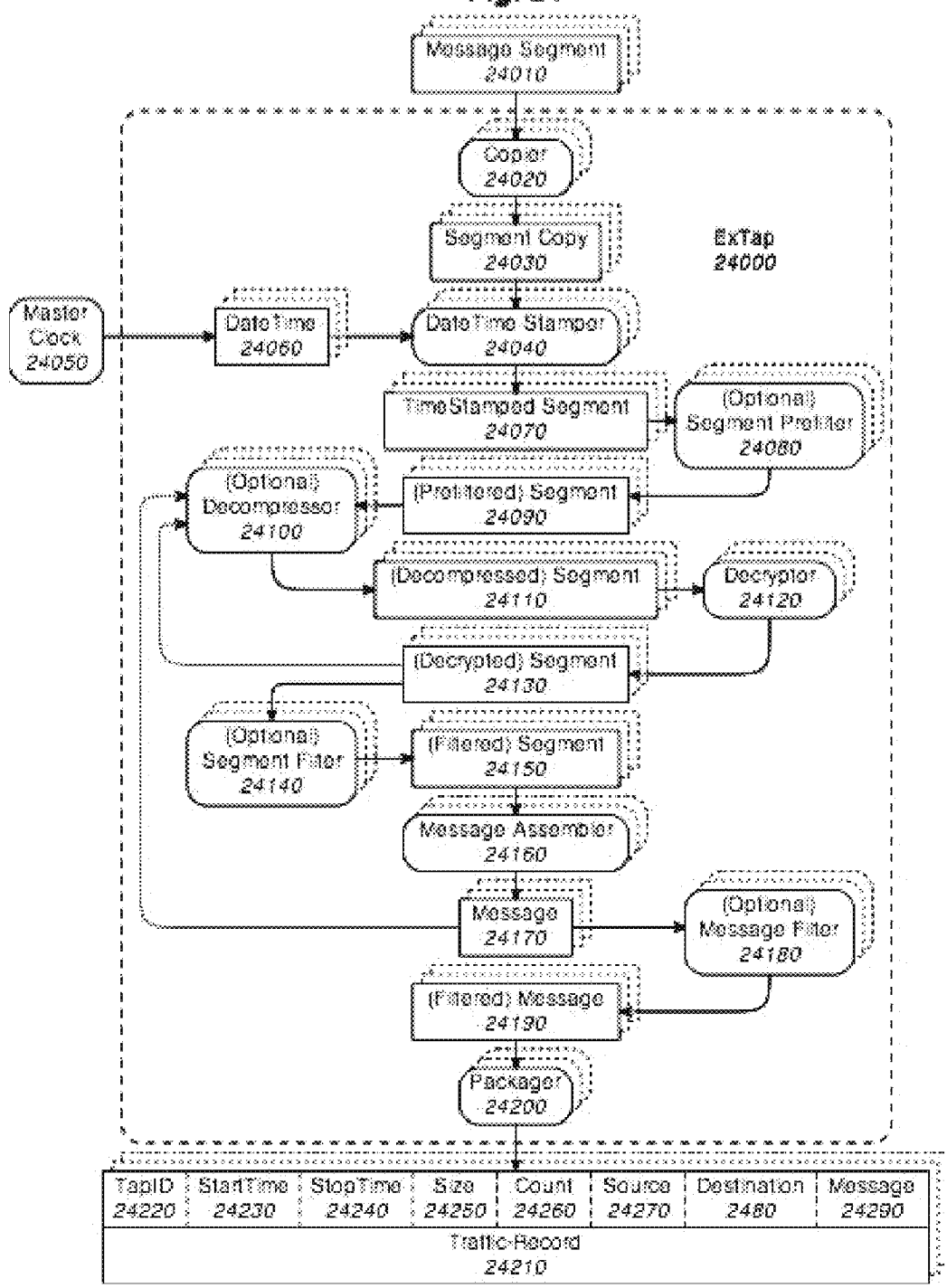
FIG. 24 is an information-flow diagram of an extap.

Turning briefly to FIG. 24, FIG. 24 illustrates an extap 24000 that exposes information from a communication channel by copying it and converting it to usable form. Each message-segment 24010 is nondestructively and unobtrusively copied by a copier 24020 as it passes through the communication channel, yielding a corresponding message-segment copy 24030.

The precise start-time at which the extap begins to receive each message-segment 24010 and the precise stop-time at which it finishes receiving the message-segment are recorded by a date-time stamper 24040 in the resulting time-stamped message-segment 24070. The start-time and stop-time may be obtained from date-time data 24060 from a single master clock 24050, to avoid clock skew.

To conserve system resources, the extap 24000 optionally condenses or omits messages and message-segments based on the needs of the MAC system, using message-segment prefilters 24080, message-segment filters 24140, and message filters 24180, according to tap-specific criteria.

Each time-stamped message-segment 24070 is optionally filtered by a message-segment prefilter 24080, based on shallow inspection of the message-segment, such as its start-time, stop-time, size, source, destination, and type, resulting in corresponding prefiltered message-segment 24090.

If any information in a (prefiltered) message-segment 24090 is compressed, it is optionally decompressed by decompressor 24100, provided that the decompressor recognizes the compression format and has, or has access to, the decompression algorithm, resulting in corresponding decompressed message-segment 24110. In case the extap 24000 cannot decompress information in a message-segment, the extap either leaves the information compressed, in the even that the metanetwork traffic monitor 1100 may utilize the message-segment. In other embodiments, the information may be omitted to conserve resources.

Similarly, if any information in a (decompressed) message-segment 24110 is encrypted, it is optionally decrypted by a decrypter 24120, provided that the decrypter recognizes the encryption format and has, or has access to, the decryption algorithm and the key to yield decrypted message-segment 24130.

Decryption includes SSL and TLS decryption as specified, for example, by the 'Cipher' header in HTTP records, as well as other methods that would be known to one of ordinary skill in the art. It also includes service-specific decoding. For example, when DB2 is running on an IBM mainframe (as opposed to Linux), the queries are compiled in the client application and assigned packet numbers corresponding to custom microcode. This means that, in order to correlate queries with the corresponding results when tapping DB2 traffic from a mainframe, the packet numbers need to be decoded into queries.

In case a decrypted message-segment 24130 contains compressed information, it is optionally routed back to the decompressor 24100. More generally, decompression and decryption are applied iteratively as appropriate, in the requisite order, since a message or message-segment may have been iteratively compressed and encrypted in arbitrary order.

Even if the extap 24000 omits the contents of a message or message-segment, for example due to filtering or inability to decompress or decrypt the data, the extap 24000 may still retain the metadata, including pen-register information such as the tap identifier, start-time, stop-time, transmission-size, source, and destination, for modeling and monitoring purposes.

Each (decrypted) message-segment 24130 is optionally filtered by a message-segment filter 24140, based on deep inspection of each message-segment, including its contents, leaving only the contents relevant to the needs of the MAC system, resulting in corresponding filtered message-segment 24150.

The (filtered) message-segments are assembled in their appropriate order into complete individual messages by a message assembler 24160, which splits message-segments containing parts belonging to more than one message into constituent message-segments belonging to individual messages; joins message-segments belonging to the same message in their appropriate order; buffers message-segments until they form a complete message or have aged past a configurable expiration limit; and then outputs the completed or otherwise terminated message 24170. In joining message-segments, a message assembler computes the start-time and stop-time of the joined message-segment as the minimum and maximum, respectively, of the start-times and stop-times of its component message-segments; and computes the size and count of the joined message-segment as the sum of the sizes and the sum of the counts, respectively, of the component message-segments, where the count of a message-segment is initialized to one. In splitting a message-segment, the message assembler copies the start-time and stop-time of the compound message-segment to each of the constituent message-segments; computes the size of each constituent message-segment according to its share of the compound message-segment; and divides the message-segment count of the compound message-segment evenly among the constituent message-segments.

Each assembled message 24170 is optionally filtered by message filter 24180, based on inspection of the entire message, leaving only the contents relevant to the needs of the MAC system, as filtered message 24190.

Message packager 24200 stores the (filtered) message 24190 and metadata in a traffic-record 24210 for use by metanetwork traffic monitors 1100 and analyzers 1110, including the tap identification 24220 of the tap from which the message was collected; the start-time 24230 of the first package in the message, and the stop-time 24240 of the last package in the message; the combined size 24250 of the message-segments from which the message was assembled; the number 24260 of constituent transmitted message-segments; the source identifier 24270 of the node transmitting the message, and the destination identifier 24280 of the node receiving the message; and the message contents 24290.

FIG. 25 illustrates a metanetwork traffic monitor 1100, which presents the correlated metanetwork traffic to analysts 25040 for purposes such as security, antifraud, forensics, operations, system administration, and marketing research, and lets analysts interactively control traffic in the metanetwork.

In detail, traffic-records 24210 from metanetwork extaps 25010 are optionally multiplexed by multiplexers 25100 into fewer channels and passed as (multiplexed) traffic-records 25110 to correlative metanetwork-traffic analyzers 1110, which analyze the causal traffic patterns in the metanetwork and store them in metanetwork model 25170, which they use to create augmented traffic-records 25120 containing adidentifying information and other desired supplemental information from causally related traffic-records.

The augmented traffic-records 25120 output by the correlative metanetwork-traffic analyzers 1110 are both fed back to metanetwork traffic monitors 1100 and passed on to network-traffic controllers 25130.

Renderers 25020 render the desired augmented traffic-records 25120 and original traffic-records 24210 in real time, outputting displays 25030 for viewing by analysts 25040. According to each analyst's needs, the traffic is rendered, with the help of metanetwork-traffic model 25170, in any of a number of different forms augmented with adidentifying information, including as overall network traffic; as individual causal traffic patterns in the metanetwork; as traffic streams from individual unitaps or bitaps; as individual causal event cascades; or as individual causal paths leading to specific events. Since access to identifying and adidentifying information is often deliberately compartmentalized for security reasons, an analyst 25040 may need to provide an access key 25050 for authorization to access certain types of data.

Network-traffic controllers 25130, in accordance with rules and other control directives 25140 issued by analysts 25040, output control-records 25160 to control traffic in the network either directly, through intaps 25180 in shunts, as network-traffic controllers 2010; or indirectly, through network nodes 25190, as network-service controllers 1120. For security reasons, an analyst may need to provide a control key 25150 for authorization to issue directives to a network-traffic controller.

Metanetwork traffic monitors 1110 also archive the traffic-records for later viewing and reanalysis. Specifically, combiners 25060 optionally combine individual traffic-records, such as a request record and its corresponding response record, or a deliberate HTTP request and response pair and the corresponding flurry of automatic request and response pairs, or an original record 24210 and any corresponding augmented traffic-record 25120 and control-record 25160, into a single combined traffic-record 25070, using causal traffic-pattern information from metanetwork-traffic model 25170. Combined traffic-records are then organized and archived by record archivers 25080 in record archives 25090. Combined traffic-records are also viewable through renderers 25020, either upon completion, or updating in real-time as component traffic-records are added to the combined traffic-record.

Figure 26:
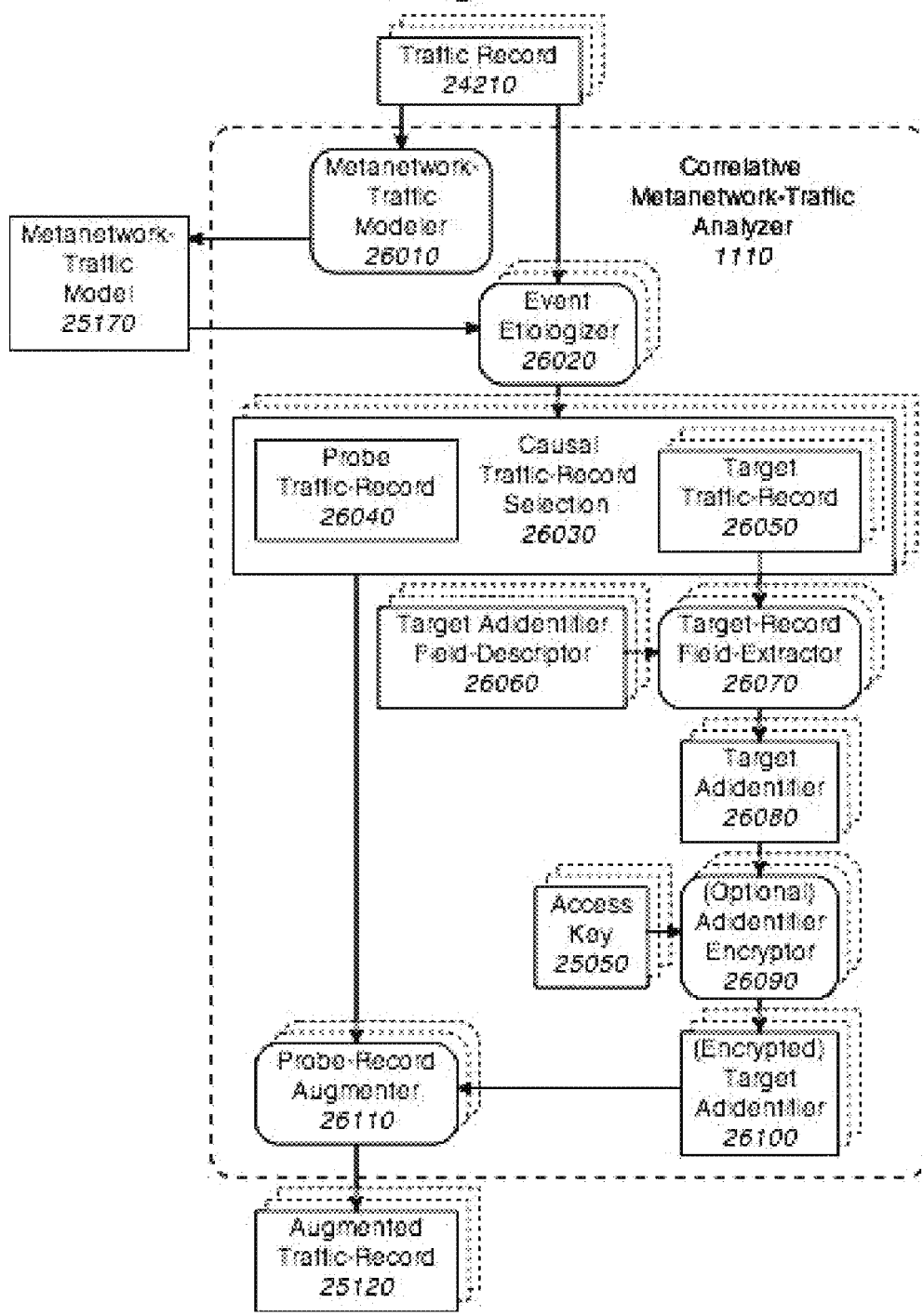
FIG. 26 is an information-flow diagram of a correlative network-traffic analyzer.

FIG. 26 illustrates a correlative metanetwork-traffic analyzer 1110 that correlates information from causally related traffic-records 24210 to create augmented traffic-records 25120 containing adidentifiers and other useful supplemental information.

Metanetwork-traffic modeler 26010 creates and maintains a model 25170 of the metanetwork traffic, for use by metanetwork-traffic etiologizer 26020 in finding causally related traffic-records containing desired adidentifying information. The metanetwork-traffic model is also used for visualizing and investigating traffic patterns in the metanetwork.

Metanetwork-traffic etiologizer 26020 uses the metanetwork-traffic model 25170 to find the desired target traffic-records 26050 corresponding to each probe traffic-record 26040 among the input traffic-records 24210, binding each probe traffic-record together with the corresponding target traffic-records as a causal traffic-record selection 26030.

Target-traffic-record field-extractors 26070 then extract the desired adidentifiers and other desired information 26080 from the target traffic-records 26050, finding the information as directed by target adidentifier field-descriptors 26060.

To secure adidentifying information against unauthorized access, adidentifiers are optionally encrypted by adidentifier encryptors 26090 using access keys 25050, yielding (optionally) encrypted target adidentifiers 26100.

Each probe traffic-record 26040 is then augmented with any corresponding (encrypted) target adidentifiers 26100 by a probe-traffic-record augmenter 26110, resulting in an augmented traffic-record 25120.

Many of the various embodiments described herein contemplate the use of bidirectional taps, combinations of unidirectional taps, multiport taps, multiplexed taps, uni/ bidirectional shunts, port mirroring, and other devices for obtaining message segment from segments of a metanetwork, these devices may be generally referred to as "node points." These various node points may be used to obtain, capture, copy, divert, or similar actions which allow message segments to be provided to the system 1000 (both AMAC and IMAC), and particularly to the monitor of the system.

The network traffic detection methods described herein may be utilized to detect fraudulent activity within a metanetwork (or a segment of a metanetwork). In the context of fraud detection, it may be advantageous to determine a user identifier that may be associated with a message transiting through a network. Again, a user identifier may comprise any datum yielding information about the identity of a user, such as user IP address; user IP address geolocation; user proxy IP address; user name; user ID; user password; user GUID; user 'User-Agent' HTTP header; user 'Accepts . . . ' HTTP header; user organization; user physical address; user email address; user telephone, mobile, or fax number; user MAC address; user credit-, debit-, or charge-card number; user social security number; user driver license number; user passport number; user birthdate; user record locator; user transaction datetime; product or service purchased by user; purchase quantity; purchase price; purchase location; or merchant ID.

In some instances, the analyzer 1110 may determine user identifiers from information such as linked accounts, network topology, context discovery and community finding, network flow analysis between a website server application and database servers.

In order to detect linked accounts, the analyzer 1110 may locate accounts that have uncommon identifying information in common. The simplest measure with these properties is mutually shared information. The analyzer 1110 may calculate a probability that shared information is associated with a user utilizing an equation wherein $$P\{c\}=-\log(.PI.(P(c)))/-\log(P\{c\}).$$

Figure 27:
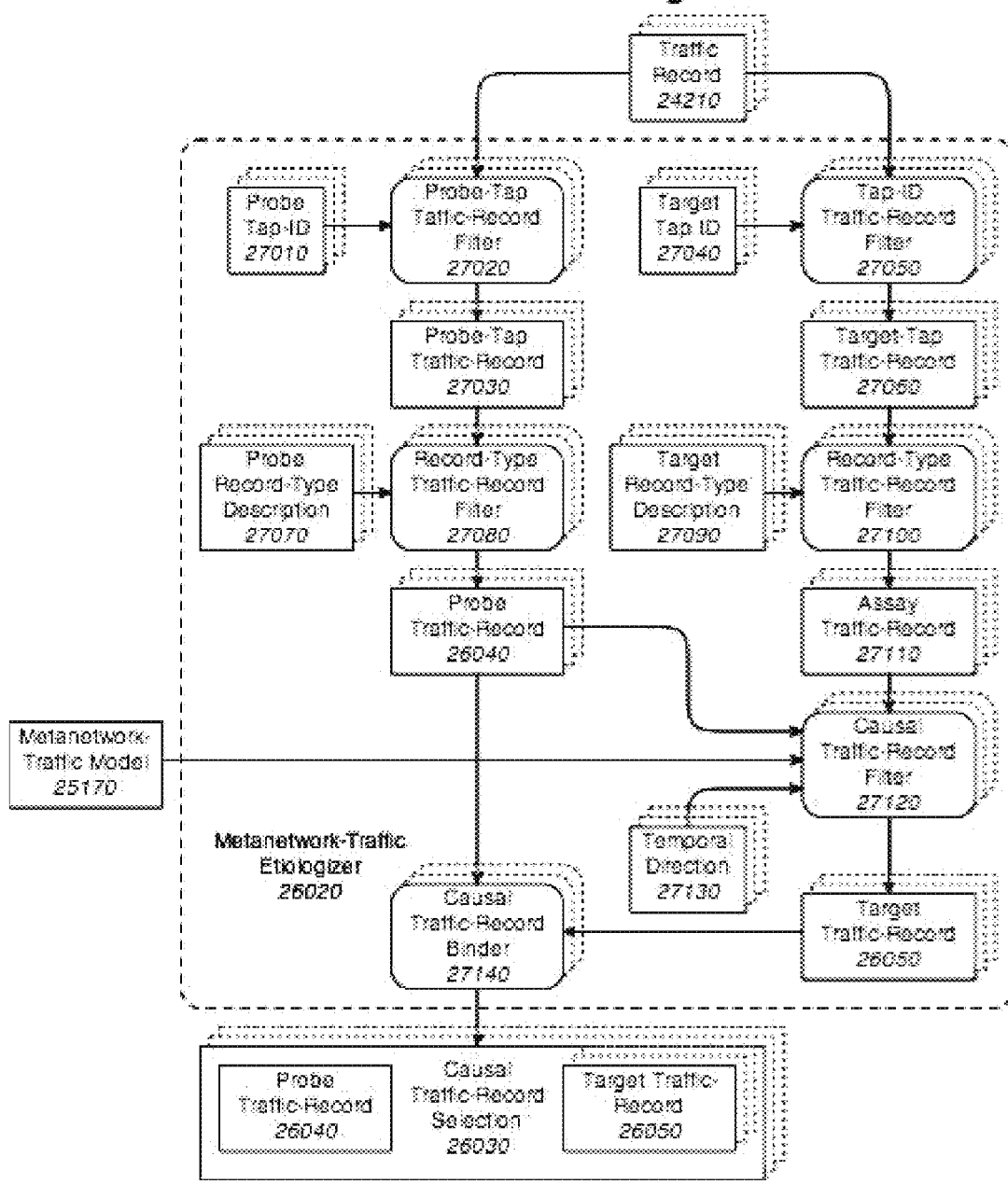
FIG. 27 is an information-flow diagram of a metanetwork-traffic etiologizer.

FIG. 27 illustrates a metanetwork-traffic etiologizer 26020 that finds target traffic-records 26040 causally connected to a probe traffic-record 26050 and likely to contain desired adidentifying information, and binds the target traffic-records to the probe traffic-record into a causal traffic-record selection 26030.

From among input traffic-records 24210, the traffic-records originating from the taps tapping network segments bearing probe traffic-records 26040 are filtered by probe-tap record-filters 27020 in accordance with probe tap-identifiers 27010, yielding probe-tap traffic-records 27030; while the traffic-records originating from the taps tapping network segments bearing target traffic-records 26050 are filtered by target-tap record-filters 27050 in accordance with target tap-identifiers 27040, yielding target-tap traffic-records 27060. Note that finding a specific adidentifier for a specific probe traffic-record may require more than tap when the same service is offered by plural nodes or requested by nodes on different network segments, such as often occurs for load balancing in high-volume networks.

From among probe-tap traffic-records 27020, the traffic-records matching probe traffic-record-type descriptions 27070 are filtered by probe traffic-record-type traffic-record filters 27080, yielding probe traffic-records 26040. Similarly, from among target-tap traffic-records 27060, the traffic-records matching target record-type descriptions 27090 are filtered by target record-type record-filters 27100, yielding assay traffic-records 27110.

Assay traffic-records 27110 are further filtered by causal record-filter 27120, retaining only the target traffic-records 26050, which are causally related to the purported probe traffic-record 26040 in the direction indicated by corresponding temporal direction 27130. If temporal direction 27130 is forwards, in the effectal direction, then the probe-assay euchronological epoch specifies a lower bound on the start time of assay traffic-records 27110—that is, an assay traffic-record must originate at or after the epoch to be considered a follower of the probe traffic-record; whereas if the temporal direction is backwards, in the causal direction, then the probe-assay euchronological epoch specifies a upper bound on the start time of assay traffic-records—that is, an assay traffic-record must originate before the epoch to be considered a leader of the assay traffic-record.

Finally, causal traffic-record binder 27140 binds target records 26050 to the probe traffic-records 26040 to which they are causally related, outputting the result as causal traffic-record selection 26030.

A metanetwork-traffic etiologizer may use a number of systems and methods to find the target traffic-records corresponding to a probe traffic-record. In the simplest case, the target traffic-records 26050 corresponding to a probe traffic-record 26040 are positively identifiable by a shared coidentifier. In this case, temporal filtering of the target traffic-records is only necessary to disambiguate between plural coidentified target traffic-records of the same type from the same target taps and antecedent to or consequent to plural probe traffic-records of the same type from the same probe taps, all sharing the same coidentifier. Such disambiguation would be needed if the adidentifiers in the precise target traffic-record corresponding to the probe traffic-record at a specific time are desired when, for example, users switch accounts or edit their profiles.

Figure 28:
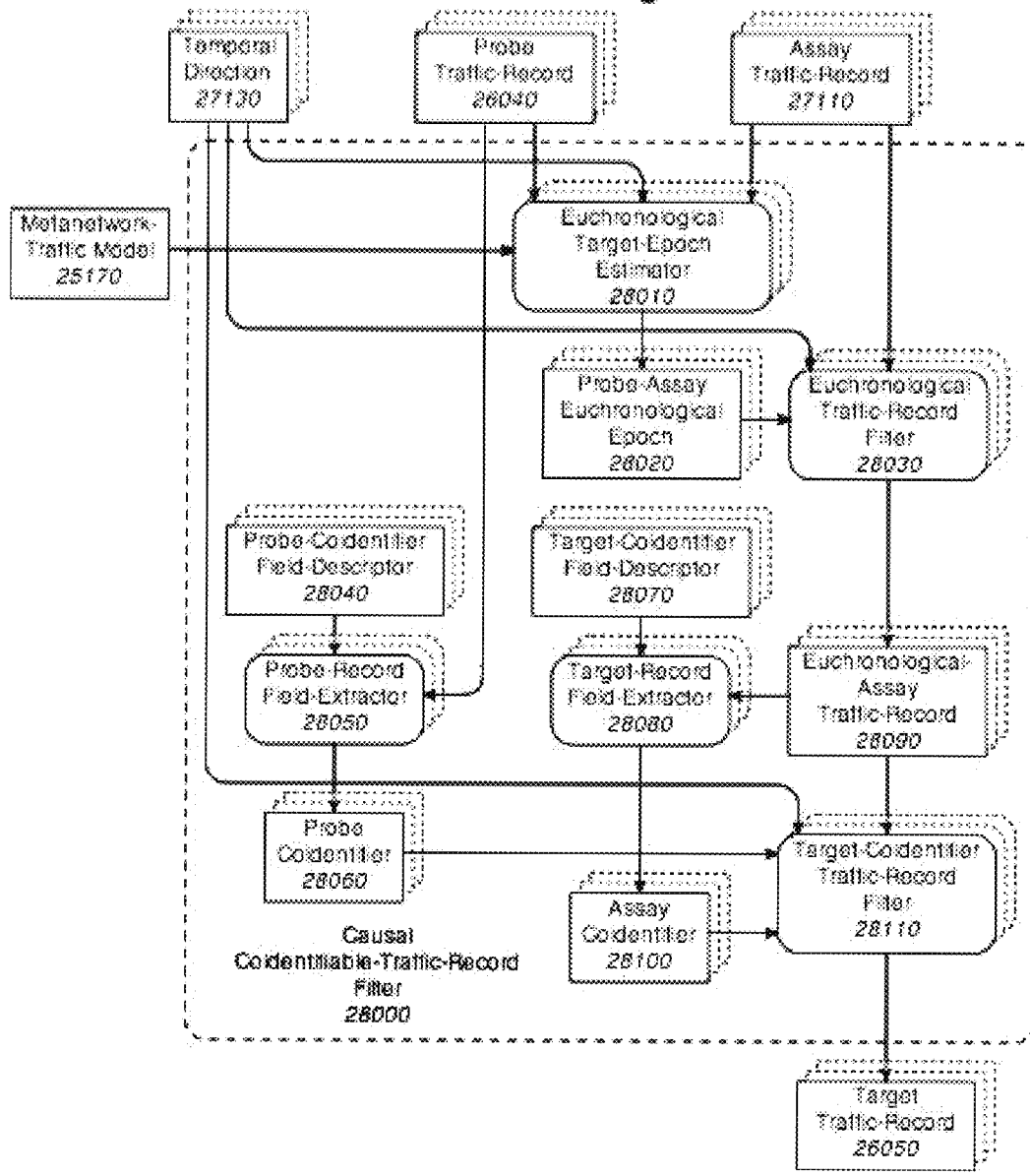
FIG. 28 is an information-flow diagram of a causal coidentifiable-traffic-record filter.

FIG. 28 shows a causal coidentifiable traffic-record filter 28000 which is one type of causal record filter 27120 (FIG. 27). A euchronological target-epoch estimator 28010, using information from metanetwork-traffic model 25170, estimates the temporal boundary between assay traffic-records 27110 related euchronologically versus dyschronologically to a given probe traffic-record 26040 in a given temporal direction 27130. outputting the result as probe-assay euchronological epoch 28020.

Euchronological traffic-record filter 28030 filters assay traffic-records 27110 in accordance with probe-assay euchronological epoch 28020 and temporal direction 27130: for a forwards temporal direction, rejecting those assay traffic-records whose start-time occurs before the epoch while passing those as followers whose start-time occurs at or after the epoch; and for a backwards temporal direction, rejecting those assay traffic-records whose start-time occurs after the epoch and passing those as leaders whose start-time occurs at or before the epoch. In the preferred embodiment, a euchronological traffic-record filter operates in the direction specified by temporal direction 27130, so that the first match found is the temporally closest to the epoch. If probe-assay euchronological epoch estimate 28020 is infinite, no records are passed.

In case more precision in disambiguating between coidentified target traffic-records of the same type is desired, the euchronological criterion may be refined by procausal 32020 and concausal 32060 criteria (see FIG. 32), using a procausal-epoch estimator 32010 with a procausal traffic-record filter 32020 and a concausal-epoch estimator 32050 with a concausal traffic-record filter 32060 in place of or in addition to euchronological-epoch estimator 28010 and euchronological record-filter 28030, as necessary for the desired degree of disambiguation.

A target-coidentifier traffic-record filter 28110 filters euchronological-assay traffic-records 28090 in accordance with probe coidentifier 28060, assay coidentifier 28100, and temporal direction 27130, passing those assay traffic-records whose assay coidentifier matches the probe coidentifier, and rejecting those whose coidentifiers don't match, where assay coidentifier 28100 is extracted from traffic-records 28090 by target-traffic-record field-extractor 28080 in accordance with target coidentifier field-descriptor 28070, and probe coidentifier 28060 is extracted from corresponding probe traffic-record 26040 by probe-traffic-record field-extractor 28050 in accordance with probe coidentifier field-descriptor 28040. In the preferred embodiment, a target-coidentifier traffic-record filter operates in the direction specified by temporal direction 27130, so that the first match found is the temporally closest to the epoch.

The target coidentifier traffic-record filter 28110 determines a coidentifier match using a coidentifier translator (not shown), which may operate either from probe coidentifier 28060 to assay coidentifier 28100, from assay coidentifier 28110 to probe co-identifier 28060, or from each to a normalized form. The match may be performed using, for example, algorithms and lookup tables—in the simplest case, merely an equality test.

Euchronological traffic-record filter 28030 and target-coidentifier traffic-record filter 28110 may be applied in either order or concurrently, depending on available time and other computational resources; for example, the filter likely to narrow down the initial set of assay traffic-records more efficiently may be applied first. A causal coidentifiable-traffic-record filter 28000 may terminate filtering as soon as any component filter reduces the number of assay traffic-records to or below an acceptable number—defaulting to one—for the purpose at hand. More than one euchronological target-epoch estimator 28010 may be applied in succession to speed operation and minimize computation when a simpler criterion suffices; for example, rudimentary euchronological-epoch estimator 29000 (See FIG. 29) may be applied first, followed if necessary by segmentwise-euchronological epoch estimator 31000 (See FIG. 31).

Figure 29:
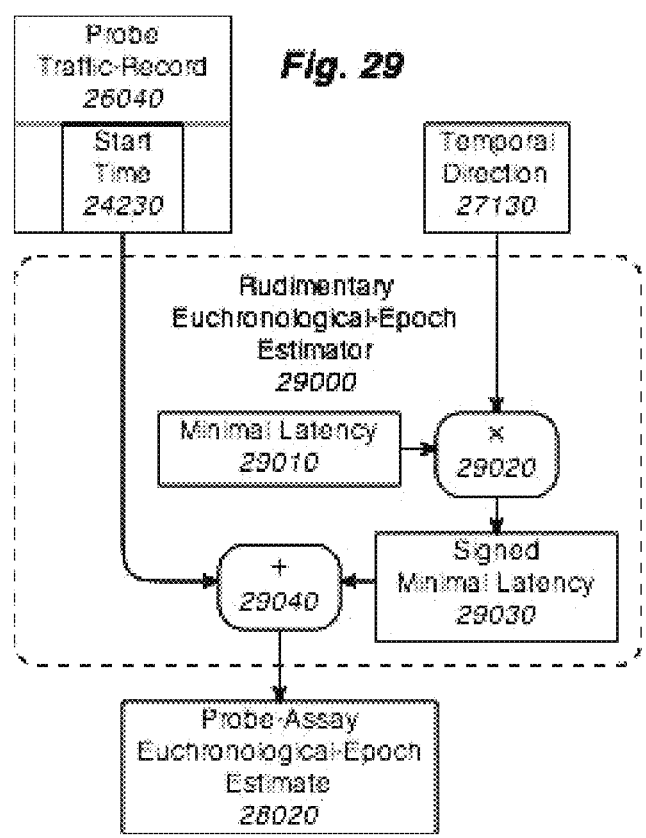
FIG. 29 is an information-flow diagram of a rudimentary euchronological-epoch estimator.

FIG. 29 depicts a rudimentary euchronological-epoch estimator 29000, which is one type of target-epoch estimator 28010 (FIG. 28). It takes a configurable minimal latency 29010, multiplies it by the temporal direction 27130 (defined as +1 for forwards, and -1 for backwards), and adds the resulting signed minimal latency 29030 to the start-time 24230 of probe traffic-record 26040, outputting the sum as probe-assay euchronological-epoch estimate 28020. For example, for a probe traffic-record start-time of 6:00:00.000 and a minimal latency of 100 ms, a forward temporal direction yields an epoch estimate of 6:00:00.100, meaning that it takes at least 100 ms to get from the probe tap to the target tap, so only assay traffic-records with a start-time of 6:00:00.100 or later will be accepted as euchronologically following the probe traffic-record; a backward temporal direction, on the other hand, yields an epoch estimate of 5:59:59:900, meaning that it takes at least 100 ms to get from the target tap to the probe tap, so only assay traffic-records with a start-time of 5:50:59.900 or earlier will be accepted as euchronologically leading the probe traffic-record. The minimal latency 29010 defaults to zero, which is adequate in low-traffic situations.

Figure 30:
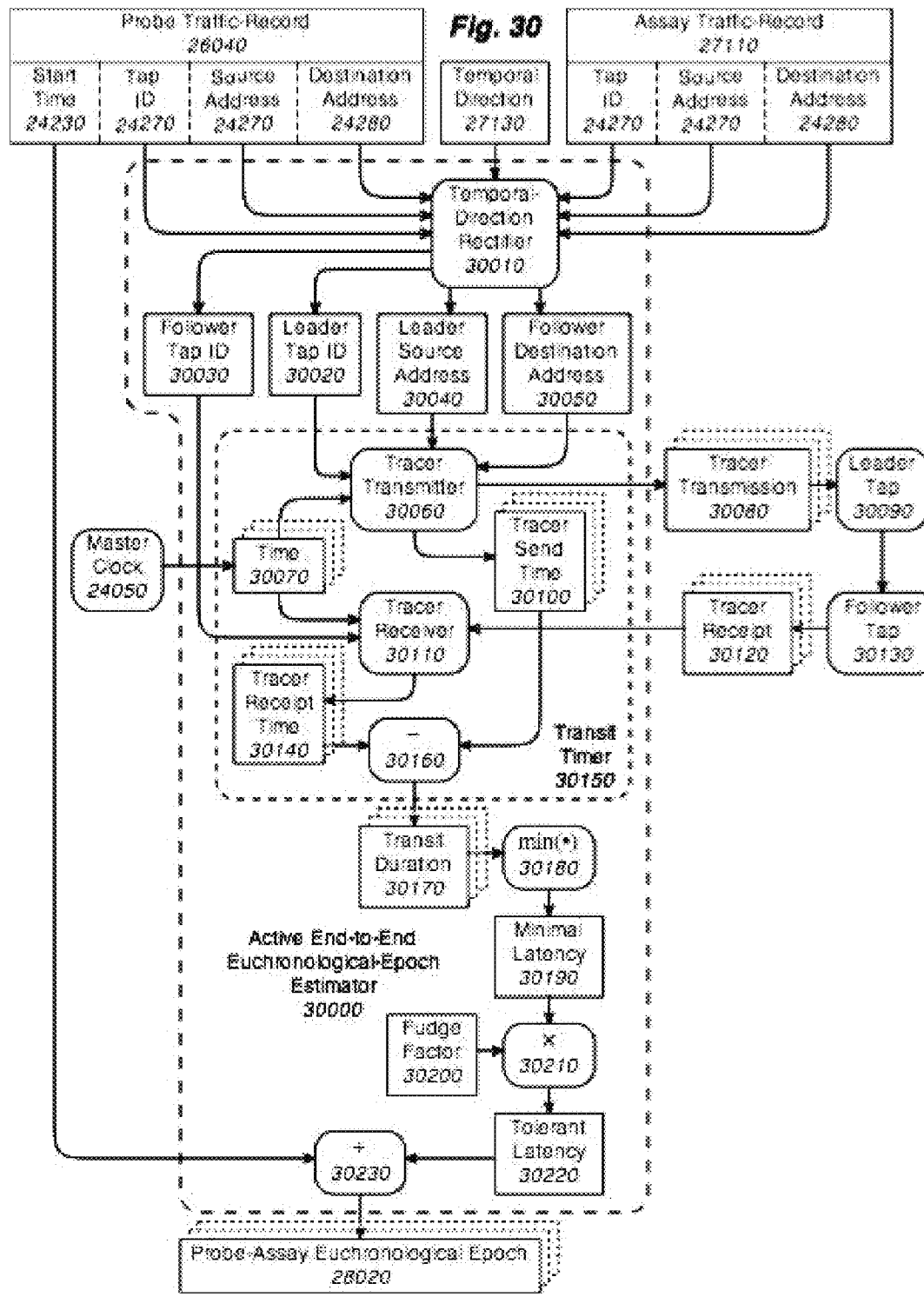
FIG. 30 is an information-flow diagram of an active end-to-end euchronological-epoch estimator.

FIG. 30 illustrates the estimation of euchronological latency in an IMAC system. The latency can be estimated by transmitting and receiving timing tracers end-to-end through the appropriate shunts and measure the transit time, as illustrated by active end-to-end euchronological-epoch estimator 30000. This is another type of target-epoch estimator 28010 (FIG. 28).

Given a probe traffic-record 26040 and an assay traffic-record 27110, temporal-direction rectifier 30010 determines which is the leader and which is the follower according to temporal direction 27130, outputting leader tap identifier 30020 and leader source address 30040 from tap identifier 24270 and source address 24270, respectively, either of the probe traffic-record for the forward direction, or of the assay traffic-record for the backward direction; and outputting follower tap identifier 30030 and follower destination address 30050 from tap identifier 24270 and destination address 24280, respectively, either of the assay traffic-record for the forward direction, or of the probe traffic-record for the backward direction.

In transit timer 30150, tracer transmitter 30060 then transmits a statistically sufficient number of distinguishable (for example by sequence number) transmissions 30080 to leader tap 30090, recording the current time 30070 from master clock 24050 as tracer send time 30100 upon each transmission, whereafter tracer receiver 30110 receives each transmission as tracer receipt 30120 from follower tap 30130, recording the current time from the master clock as tracer receipt time 30140. Subtractor 30160 subtracts each tracer receipt time 30140 from the corresponding tracer send time 30100, outputting the result as transit duration measurement 30170. If no tracer receipt for a tracer transmission is received before a configurable timeout period, that tracer's duration is set to infinity.

Minimum function 30180 computes the shortest transit duration from among the timing tracers, outputting the result as minimal latency 30190. If the follower is unreachable from the leader, the resulting minimum is infinite.

Scaler 30210 reduces the minimum latency measurement by relative fudge factor 30200 to a more-conservative minimum-latency estimate 30220, where the fudge factor may be a configurable value such as 0.75, or may be derived from the estimated relative standard deviation of the measured transit durations.

Finally, adder 30230 adds latency estimate 30220 to start-time 24230 from probe-traffic-record 26040 to yield estimated probe-assay euchronological epoch 28020.

Figure 31:
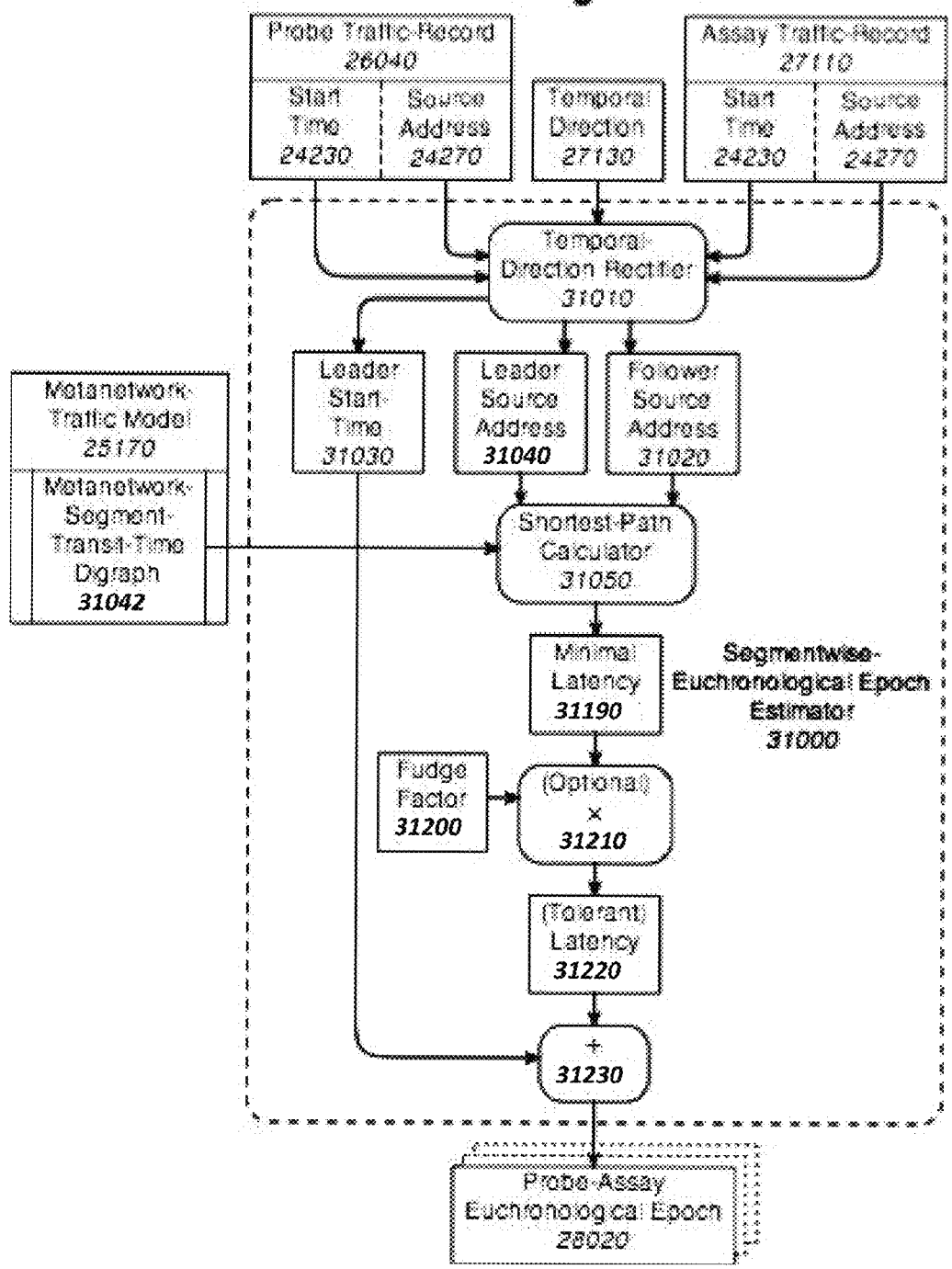
FIG. 31 is an information-flow diagram of a segmentwise-euchronological epoch estimator.

FIG. 31 depicts a segmentwise-euchronological epoch estimator 3100, which is yet another type of target-epoch estimator 28010 (FIG. 28). It estimates the probe-assay euchronological epoch by summing the minimum transit times for each segment along the shortest path between the probe and the target.

Given a probe traffic-record 26040 and an assay traffic-record 27110, temporal-direction rectifier 31010 determines which is the leader and which is the follower according to temporal direction 27130, outputting leader source address 31040 and follower source address 31020 from source address 24270 either of the probe traffic-record and assay traffic-record, respectively, for the forward direction; or of the assay traffic-record and the probe traffic-record, respectively, for the backward direction.

Shortest-path calculator 31020 determines the shortest path from leader source address 31040 to follower source address 31020 in metanetwork-segment-transit-time digraph 31042 in metanetwork-traffic model 25170, which is created and kept up to date by metanetwork-traffic modeler 26010, and gives the minimum transit time in each direction for each network segment in the metanetwork. The shortest-path calculator may use any of a number of algorithms, such as Dijkstra's algorithm, the A* algorithm, the B* algorithm, or the Bellman-Ford algorithm. In general, the minimum transit times in opposite directions differ even for a symmetrical channel, because most dialogs are asymmetrical, so that the actual amount of traffic differs between the two directions. Thus if a bidirectional shortest-path calculating algorithm is used, steps taken from the target towards the probe must proceed backwards, or head-to-tail, along each segment, using the targetward transit time, rather than the probeward transit time. If no path is found from the leader source address to the follower source address, the minimal latency is set to infinity.

Optional scaler 31210 reduces the minimum latency estimate by relative fudge factor 31200 to a more-conservative minimum-latency estimate 31220, where the fudge factor may be a configurable value such as 0.75, or may be derived from the estimated relative overall standard deviation of the segment-transit durations.

Finally, adder 31230 adds latency estimate 31220 to start-time 24230 from probe-traffic-record 26040 (see FIG. 26) to yield estimated probe-assay euchronological epoch 28010 (see FIG. 28).

Figure 32:
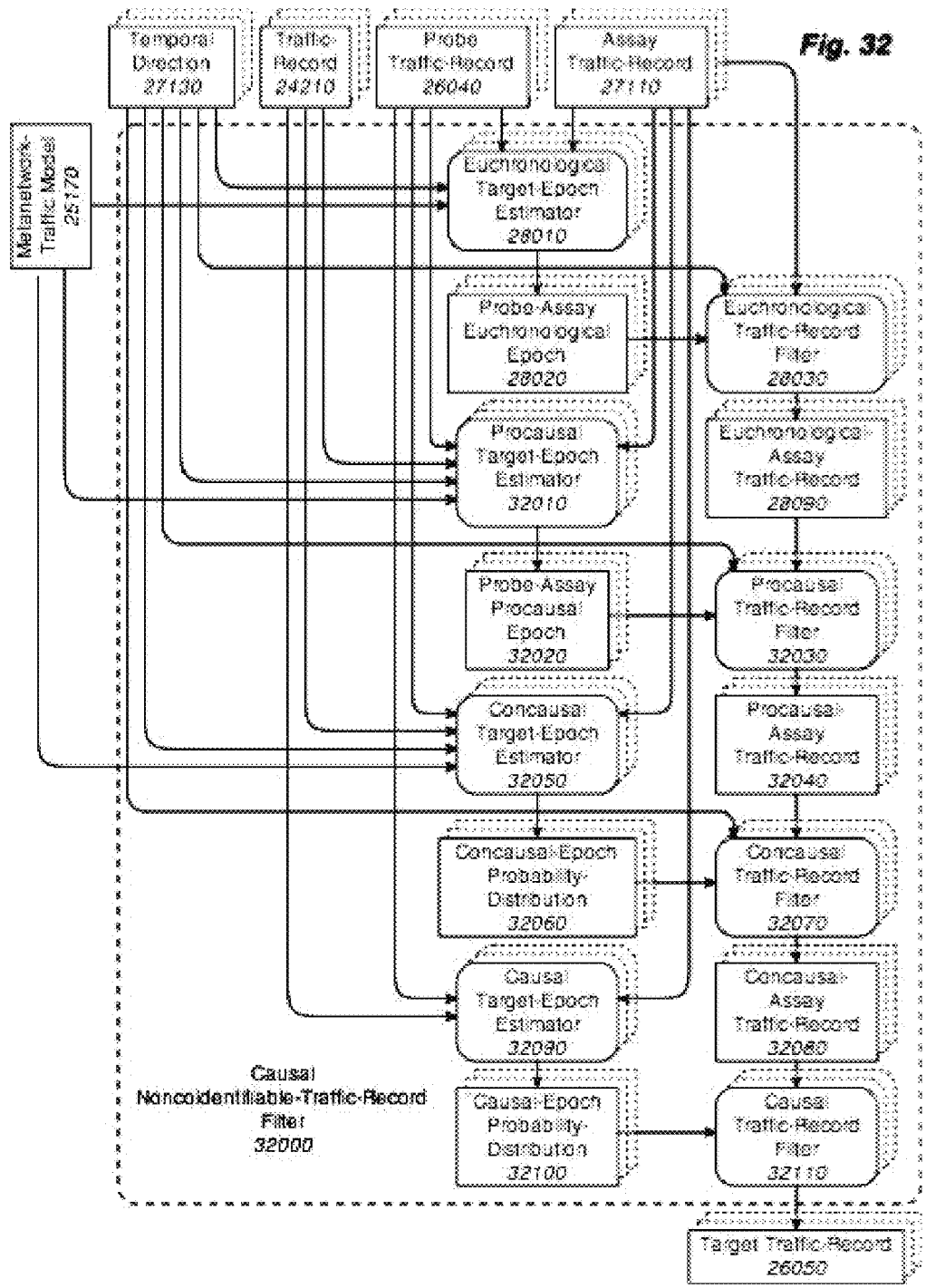
FIG. 32 is an information-flow diagram of a causal noncoidentifiable-traffic-record filter.

FIG. 32 illustrates a causal noncoidentifiable-traffic-record filter 32000, which is another type of causal record filter 27120 (FIG. 27). When probe and target traffic-records are not explicitly linked by coidentifying information, the correspondence between probe traffic-records 26040 and target traffic-records 26050 is determined by more-sophisticated temporal means and by their coinformativeness. A causal noncoidentifiable-traffic-record filter 32000 finds the target traffic-records corresponding to a probe traffic-record using euchronological, procausal, concausal, and causal criteria.

Euchronological target-epoch estimator 28010, using information from metanetwork-traffic model 25170, estimates the temporal boundary between assay traffic-records 27110 related euchronologically versus dyschronologically to a given probe traffic-record 26040 in a given temporal direction 27130. outputting the result as probe-assay euchronological epoch 28020.

Euchronological traffic-record filter 28030 filters assay traffic-records 27110 in accordance with probe-assay euchronological epoch 28020 and temporal direction 27130: for a forwards temporal direction, rejecting those assay traffic-records whose start-time occurs before the epoch while passing those a followers whose start-time occurs at or after the epoch; and for a backwards temporal direction, rejecting those assay traffic-records whose start-time occurs after the epoch and passing those as leaders whose start-time occurs at or before the epoch. In the preferred embodiment, a euchronological traffic-record filter operates in the direction specified by temporal direction 27130, so that the first match found is the temporally closest to the epoch. If probe-assay euchronological epoch estimate 28020 is infinite, no records are passed.

Procausal target-epoch estimator 32010, using segment-transit-timing information from metanetwork-traffic model 25170, along with timing information from actual traffic-records 24210 seen on those metanetwork segments, estimates the temporal boundary between euchronological assay traffic-records 28090 related procausally versus non-procausally to a given probe traffic-record in a given temporal direction 27130, outputting the result as probe-assay procausal epoch 32020. In general, because the procausal criterion depends on finding an actual successive or predecessive traffic-record in each segment along the way, it yields a longer minimal-latency estimate than the euchronological criterion, so that the procausal epoch is as far or further from the leader than the euchronological epoch, making it generally more restrictive.

Procausal traffic-record filter 32030 filters euchronological-assay traffic-records 28090 in accordance with probe-assay procausal epoch 32020 and temporal direction 27130, passing only those whose start-time occurs after or before the epoch, as successors or predecessors, depending on whether the temporal direction is forwards or backwards, respectively. If probe-assay procausal epoch estimate 32020 is infinite, no records are passed.

Concausal target-epoch estimator 32050, using segment-transit-timing information and node-specific service-timing information from metanetwork-traffic model 25170, along with timing information from actual traffic-records 24210 of the appropriate types seen on those metanetwork segments across those nodes, probabilistically estimates the time at which a target traffic-record 26050 of a given type concausally related to the probe traffic-record 26040 in a given temporal direction 27130 is expected to occur, outputting the result as probe-assay concausal-epoch probability distribution 32060. In general, because the concausal criterion depends on finding a pair of actual concausally related precursor+postcursor pair of traffic-records across each node along the way, it yields a longer minimal-latency estimate than the procausal criterion, so that the bulk of the concausal-epoch probability-distribution 32060 is as far or further from the leader than the procausal epoch, making it generally more restrictive.

Concausal traffic-record filter 32070 filters procausal-assay traffic-records 32040 in accordance with probe-assay concausal probability-distribution 32060 and temporal direction 27130, rejecting those whose start-time corresponds to a probability below a configurable threshold, and labelling the remainder with their respective concausal-probability estimates.

Causal target-epoch estimator 32090, using segment-transit-timing information, node-specific service-timing information, and node-specific transservice coinformation from metanetwork-traffic model 25170, along with timing information from actual traffic-records 24210 of the appropriate types seen on those metanetwork segments across those nodes, probabilistically estimates the time at which a target traffic-record 26050 of a given type causally related to the probe traffic-record 26040 in a given temporal direction 27130 is expected to occur, outputting the result as probe-assay causal-epoch probability distribution 32100. In general, because the causal criterion depends on finding a pair of actual causally related antecedent+consequent traffic-records across each node along the way, it yields a longer minimal-latency estimate than the concausal criterion, so that the bulk of the causal-epoch probability-distribution is as far or further from the leader than the concausal epoch, making it generally more restrictive.

Causal traffic-record filter 32110 filters concausal-assay traffic-records 32080 in accordance with probe-assay causal probability-distribution 32100 and temporal direction 27130, rejecting those whose start-time corresponds to a probability below a configurable threshold, and labelling the remainder with their respective causal-probability estimates.

The euchronological, procausal, concausal, and coinformativeness criteria may be applied in any order, including concurrently, depending on available time and other computational resources; for example, the filters may advantageously be applied in order of decreasing likely efficiency in terms of assay-traffic-record reduction relative to computational resources. The causal noncoidentifiable-traffic-record filter 32000 may terminate filtering as soon as any component filter reduces the number of assay traffic-records to or below an acceptable number—defaulting to one—for the purpose at hand. In low-traffic conditions, a rudimentary euchronological filter alone may suffice.

Figure 33:
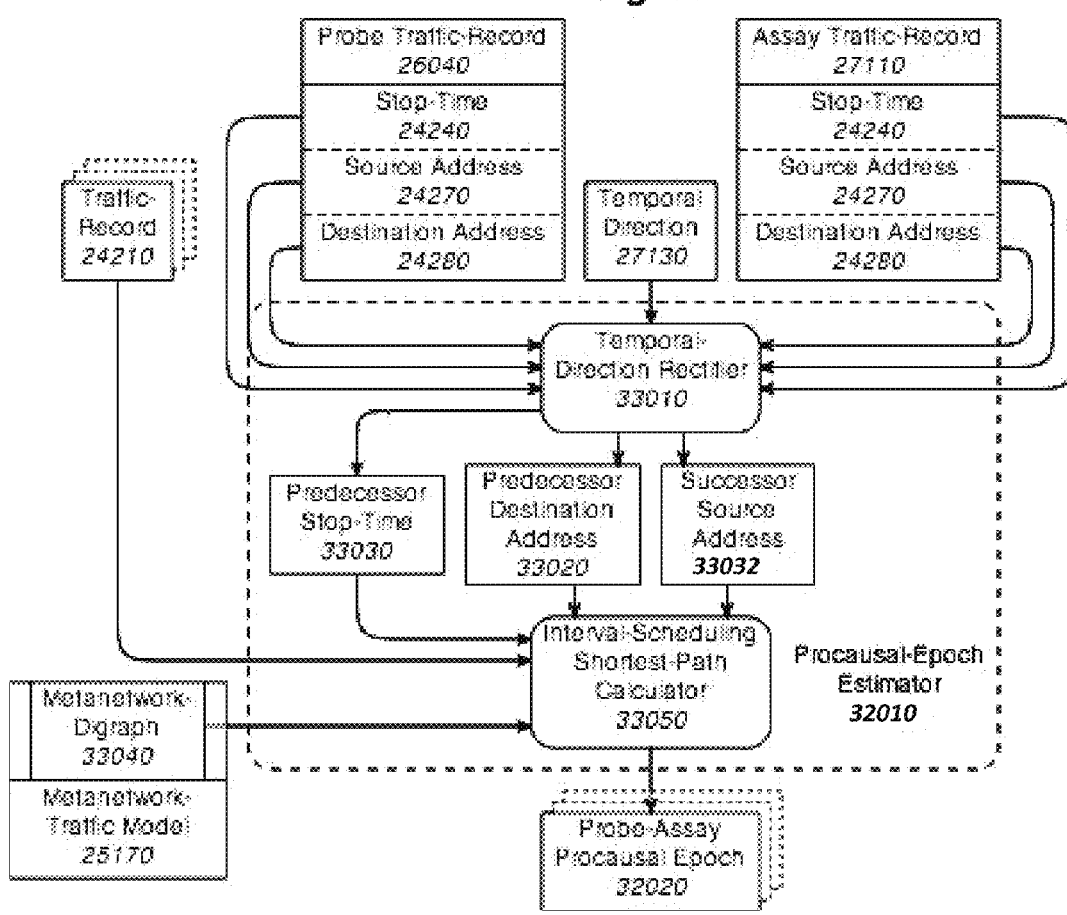
FIG. 33 is an information-flow diagram of a procausal target-epoch estimator.

FIG. 33 depicts the procausal epoch estimator 32010, which estimates the probe-assay procausal epoch 32020 by calculating the shortest path between the probe and the target under the constraint that successive segments correspond to nonoverlapping intervals from the start- and stop-times of actually observed traffic-records on the respective segments. Given a probe traffic-record 26040 and an assay traffic-record 27110, temporal-direction rectifier 33010 determines which is the predecessor and which is the successor according to temporal direction 27130, outputting predecessor destination address 33020, predecessor stop-time 33030, and successor source address 33032 from destination address 24280 and stop-time 24240 of the probe traffic-record 26040 and the source address 24270 of the assay traffic-record 27110, respectively, for the forward direction; or from the destination address 24280 and stop-time 24240 of the assay traffic-record 27110 and the source-address 24270 of the probe traffic-record 26040, respectively, for the backward direction.

Given predecessor destination address 33020, successor source address 33032, and predecessor stop-time 33030, interval-scheduling shortest-path calculator 33050 determines the shortest path from the predecessor destination address to the successor source address by retracing actual nonoverlapping traffic records 24210 through metanetwork topology digraph 33040 in metanetwork-traffic model 25170, which is created and kept up to date by metanetwork-traffic modeler 26010, and directly outputs the probe-assay procausal epoch 32020 as its result. An interval-scheduling shortest-path scheduler combines the standard first-to-finish interval-scheduling algorithm with any appropriate shortest-path algorithm, using the stop-time of each traffic record as the distance. For example, to combine interval-scheduling with the Dijkstra algorithm: 0. Initialize the state of each arc (i.e. directed metanetwork segment) to 'unvisited'; 1. Initialize the distance of each vertex (i.e. metanetwork node) in the metanetwork digraph to infinity and 'tentative'; 2. Initialize the current vertex to the origin, representing the predecessor destination address, and set its distance to the predecessor stop-time and 'definitive'; 3. For each arc leaving the current vertex, find the traffic-record on that arc (i.e. unitap), if any, with the earliest stop-time whose start-time is greater than or equal to the distance of the current vertex, and mark the state of that arc as 'visited'. If that stop-time is earlier than the distance of the terminal vertex of that arc, change the distance of the terminal vertex to that stop-time; If all arcs entering the current vertex are marked 'visited', mark the vertex as 'definitive'; If the current vertex is marked 'definitive' and is the goal, representing the successor source address; or if there are no more 'tentative' vertices, exit the algorithm and return the goal's distance as the procausal epoch; and 6. Set the current vertex to the 'tentative' vertex with the smallest distance, and return to step 3.

Figure 34:
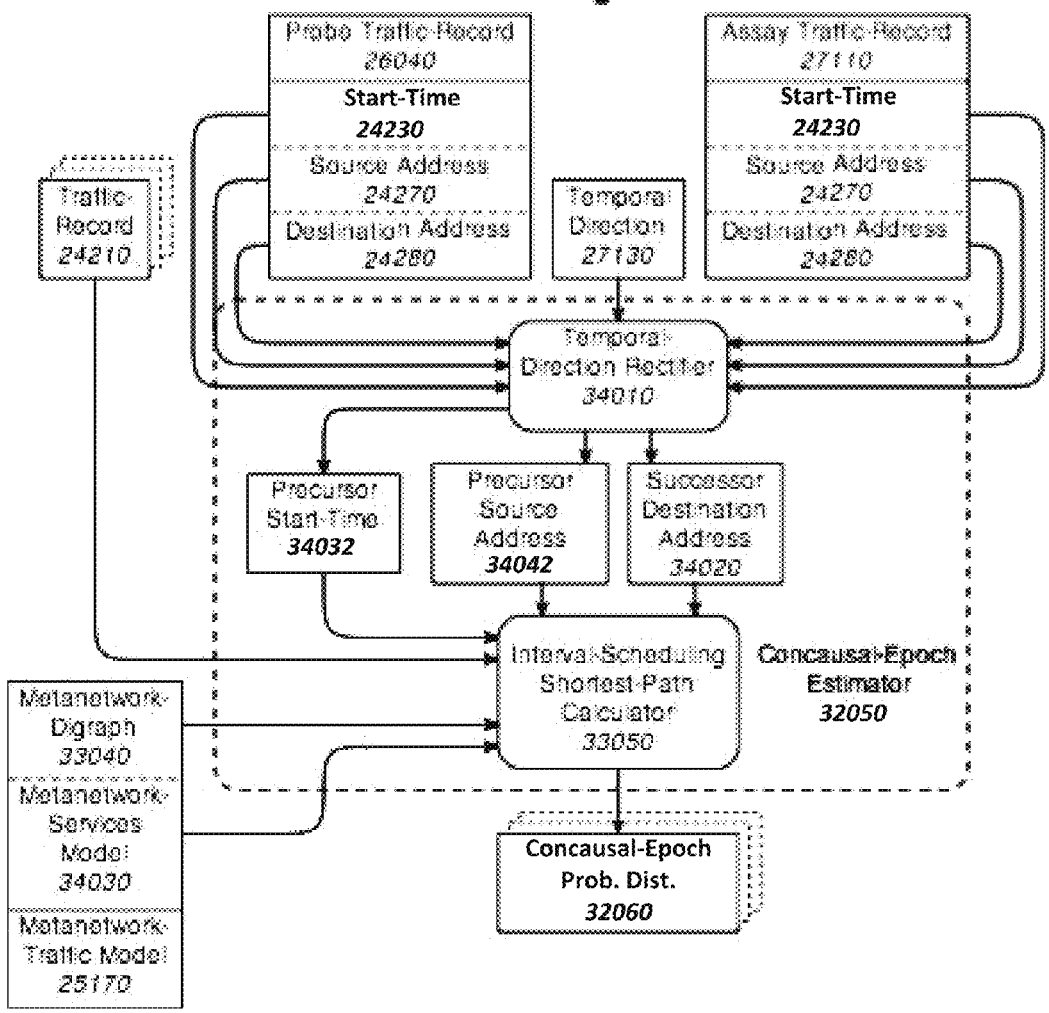
FIG. 34 is an information-flow diagram of a concausal target-epoch estimator.

FIG. 34 depicts a concausal epoch estimator 32050, which estimates the probe-assay concausal epoch probability distribution 32060 by calculating the shortest path between the probe and the target under the constraint that successive segments correspond to nonoverlapping intervals from the start- and stop-times of actually observed traffic-records on the respective segments. Given a probe traffic-record 26040 and an assay traffic-record 27110, temporal-direction rectifier 34010 determines which is the precursor and which is the successor according to temporal direction 27130, outputting precursor source address 34042, precursor start-time 34032, and successor destination address 34020 from source address 24270 and start-time 24230 of the probe traffic-record 26040 and the destination address 24280 of the assay traffic-record 27110, respectively, for the forward direction; or from source address 24270 and start-time 24230 of the assay traffic-record 27110 and the destination address 24280 of the probe traffic-record 26040, respectively, for the backward direction.

The system may employ a metanetwork-topology mapper, which deduces the metanetwork topology 33040, including the location of the taps therein. For computational efficiency, the metanetwork mapper may be structured modularly, with a separate network-topology mapper for each type of network or subnetwork, and the modules may be structured hierarchically, with a separate instance of the appropriate module type for each routing domain, mirroring the hierarchical structure of the metanetwork, with higher-level modules stitching together the lower-level network topology maps.

The topology of each network can be mapped continually as messages between ports are observed; Alternatively, it can be mapped upon initial installation, and updated either periodically or whenever a change in the physical or logical network topology is detected by other means.

Topology mapping for each network may be fully manual, for example based on inspection of physical wiring; or it may be partially automated. In the preferred embodiment, it is fully automated, to ensure that the topology map is always completely up to date whenever nodes or segments are added to the network, and whenever existing nodes or segments fail or are disabled or removed from the network.

Automation of network topology mapping may be by passive or active means, depending on security concerns and convenience. Passive topology mapping means include tapping routing-protocol traffic, where available, such as Open Shortest Path First (OSPF) running in the Open Systems Interconnection (OSI) Network Layer, and Intermediate System to Intermediate System (IS-IS) running in the OSI Data Link Layer, both of which are proactive interior gateway protocols operating within a routing domain, or Autonomous System (AS), and both of which use the Dijkstra algorithm with a link-state routing protocol to determine the complete logical topology of the AS, as does Fabric Shortest Path First (FSPF) for Fibre Channel networks; Routing Information Protocol (RIP) running in the OSI Transport Layer, and Enhanced Interior Gateway Routing Protocol (EIGRP) running in the OSI Network Layer, also both proactive interior gateway protocols, both of which use a Bellman-Ford algorithm with a distance-vector routing protocol to determine only the first node on the shortest path to each destination; Border Gateway Protocol (BGP) running in the OSI Transport Layer, a proactive exterior gateway protocol operating between Autonomous Systems, which uses a Bellman-Ford algorithm with a path-vector routing protocol to determine the optimal route to each destination; and Babel, Ad hoc On-Demand Distance Vector (AODV), Dynamic Source Routing (DSR), and Destination-Sequenced Distance Vector (DSDV), all of which are reactive interior gateway protocols using a Bellman-Ford algorithm with a distance-vector protocol particularly suited for ad hoc mobile and other wireless networks. In deployments where tapping the requisite routing-protocol ports is inconvenient, network-topology information obtained from the same routing protocols may instead be actively queried by the MAC controller, for example using Simple Network Management Protocol (SNMP), traceroute, or a similar protocol, or by direct use of routing protocols. In deployments where these protocols are not available or accessible, the topology mapper may instead determine the operative network topology by other passive means, for example by analyzing the source and destination fields in current traffic-records, or even by analyzing the causal timing statistics between network segments.

The metanetwork topology map only needs to include the portions of the constituent networks relevant to the needs of the MAC system. While link-state routing protocols that facilitate mapping the topology of entire networks may be useful for network security and operations considerations, distance-vector and distance-path routing protocols that only return information about the network routes likely to be used are all that are needed for correlative metanetwork monitoring, analysis, and control. In fact, by this criterion, deducing the actually operative metanetwork topology from the source and destination fields in current traffic-records is often the most efficient method.

In addition to recording the logical connections between the nodes, the metanetwork topology map labels each network segment with information identifying the taps tapping each network segment in each direction, along with their respective port numbers, for diagnostic purposes and to indicate which segments are tapped and which are not. The network type, as well as the routing protocol or other means used to determine the network topology, is also indicated for each (sub-)network.

Figure 35:
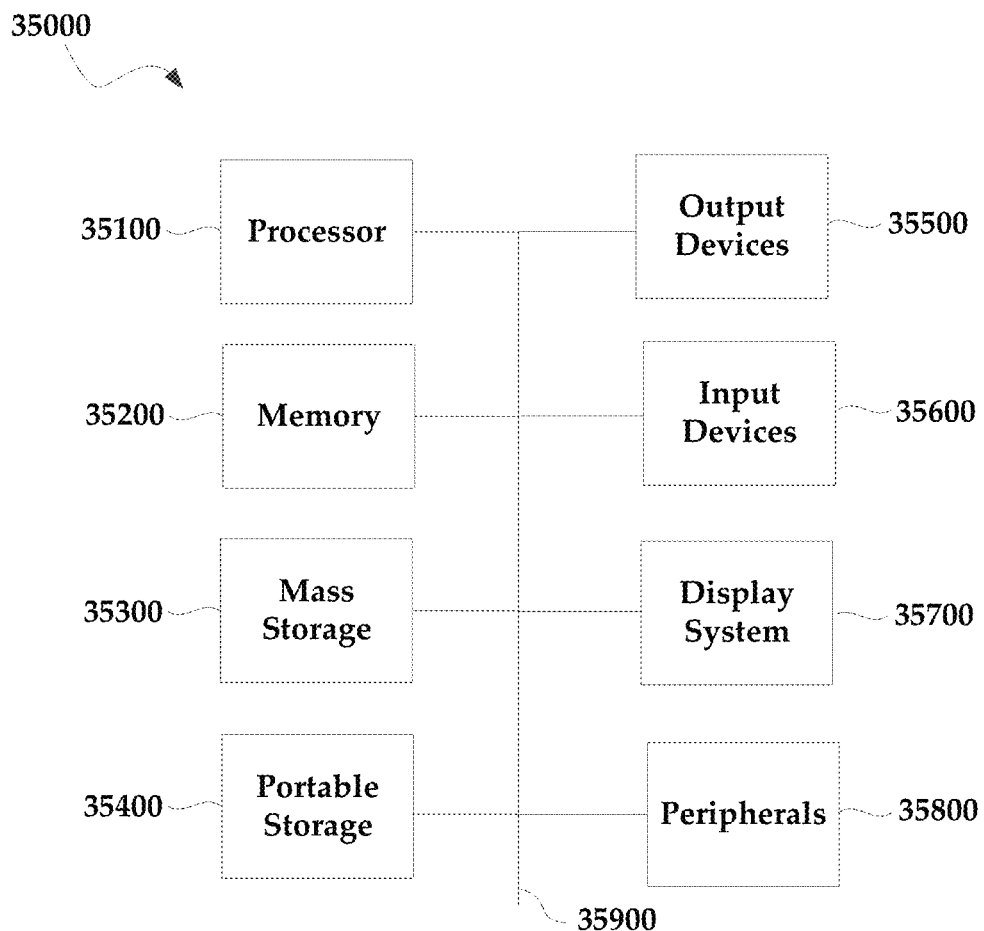
FIG. 35 illustrates an exemplary computing system that may be used to implement embodiments according to the present technology.

FIG. 35 illustrates a computing system 35000 that may be implemented in the contexts of the likes of client computing systems, networks, servers, clouds, or combinations thereof. The computing system 35000 of FIG. 35 includes one or more processors 35100 and main memory 35200. Main memory 35200 stores, in part, instructions and data for execution by processor 35100. Main memory 35200 may store the executable code when in operation. The system 35000 of FIG. 35 further includes a mass storage device 35300, portable storage medium drive(s) 35400, output devices 35500, user input devices 35600, a graphics display 35700, and peripheral devices 35800.

The components shown in FIG. 35 are depicted as being connected via a single bus 35900. The components may be connected through one or more data transport means. Processor unit 35100 and main memory 35200 may be connected via a local microprocessor bus, and the mass storage device 35300, peripheral device(s) 35800, portable storage device 35400, and graphics display 35700 may be connected via one or more input/output (I/O) buses.

Mass storage device 35300, which may be implemented with a magnetic disk drive or an optical disk drive, is a non-volatile storage device for storing data and instructions for use by processor unit 35100. Mass storage device 35300 may store the system software for implementing embodiments of the present technology for purposes of loading that software into main memory 35200.

Portable storage device 35400 operates in conjunction with a portable non-volatile storage medium, such as a floppy disk, compact disk, digital video disc, or USB storage device, to input and output data and code to and from the computing system 35000 of FIG. 35. The system software for implementing embodiments of the present technology may be stored on such a portable medium and input to the computing system 35000 via the portable storage device 35400.

Input devices 35600 provide a portion of a user interface. Input devices 35600 may include an alphanumeric keypad, such as a keyboard, for inputting alpha-numeric and other information, or a pointing device, such as a mouse, a trackball, stylus, or cursor direction keys. Additionally, the system 35000 as shown in FIG. 35 includes output devices 35500. Suitable output devices include speakers, printers, network interfaces, and monitors.

Graphics display 35700 may include a liquid crystal display (LCD) or other suitable display device. Graphics display 35700 receives textual and graphical information, and processes the information for output to the display device.

Peripherals 35800 may include any type of computer support device to add additional functionality to the computing system. Peripheral device(s) 35800 may include a modem or a router.

The components provided in the computing system 35000 of FIG. 35 are those typically found in computing systems that may be suitable for use with embodiments of the present technology and are intended to represent a broad category of such computer components that are well known in the art. Thus, the computing system 35000 of FIG. 35 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Figure 36:
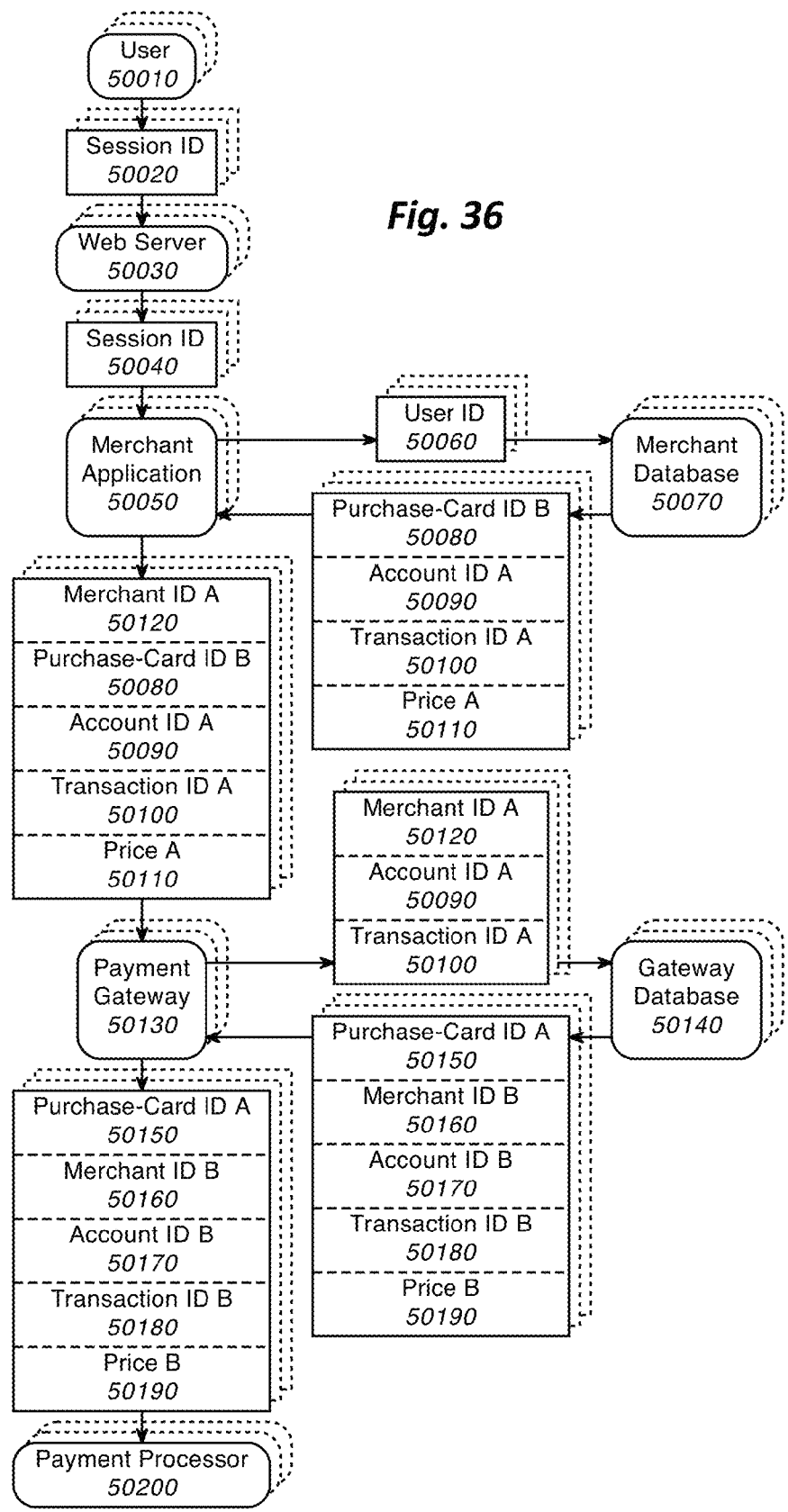
FIG. 36 illustrates an exemplary use case for practicing aspects of the present technology.

FIG. 36 illustrates nontemporal forms of identifying information passed through from user 50010 to purchase-card payment processor 50200 for a typical online credit-card purchase using stored account information. For reasons of security and proprietariness, there may be no common identifiers between corresponding traffic-records tapped before and after the merchant application 50050, or before and after the payment gateway 50130. Thus if the merchant stores a purchase-card ID at all, it may be a hashed version provided by the gateway and bearing no obvious relationship to the clear-text purchase-card ID seen by the user and the payment processor. Even the recorded purchase price for a transaction may differ, for example if the gateway handles currency conversion.

Threat analysts at the merchant's website viewing a web session which is tapped in front of or behind the web server 50030 only see a session ID 50040, but want to know the user ID and the user's account number, which requires tapping the traffic to and from the merchant database 50070 and correlating the session ID with the user ID, and the user ID with the account ID.

Threat analysts at the payment processor want to know whether threat analysts at the merchant's website have found evidence of fraud in the website session, which requires correlating the session ID seen at the website with the purchase-card ID seen at the payment processor.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of operating a correlative monitoring, analysis and control (MAC) system in connection with a production metanetwork having a plurality of interconnected networks including an intranet, an extranet, and a public internet, comprising:

obtaining traffic records from tap nodes disposed on respective communication channels within the metanetwork, the traffic records generated from message segments obtained from the communication channels, the traffic records including time information, source/destination information, and message content taken from the message segments, the traffic records being divided into distinct probe traffic records and target traffic records;

generating a metanetwork traffic model for the metanetwork, the metanetwork traffic model including:

a network topology graph of the metanetwork, the network topology graph created using, as input traffic records, the traffic records obtained from the metanetwork; and a network segment transit-time digraph of the metanetwork, the network-segment transit-time digraph created using the input traffic records and the network topology graph;

processing the input traffic records, the network topology graph and the network segment transit-time graph to generate causal traffic-record selections, each including a respective probe traffic-record and one or more respective target traffic-records, the processing including, for each probe traffic-record, selecting causally related target-traffic records for inclusion in a causal-record selection for the probe traffic-record;

processing each causal traffic-record selection to generate a corresponding augmented traffic record by augmenting the message content of the probe traffic-record with adidentifying information obtained from the message content of the respective target traffic-records of the causal traffic-record selection, the adidentifying information providing supplemental distinguishing information for the augmented traffic record; and displaying respective renderings of the augmented traffic-records to an analyst user, wherein (a) the probe traffic-records are provided by a first tap node in front of or behind a merchant web server and include a given probe traffic-record with a session identifier of a user session on the merchant web server, (b) the respective target traffic-records of the causal record selection containing the given probe traffic-record are provided by a second tap node tapping traffic to and from another server where the session identifier is associated with a resource identifier of a resource used in the session, and (c) the augmented traffic-record of the causal record selection includes (i) the session identifier from the given probe-traffic record, and (ii) as the adidentifying information, the resource identifier for the user session, wherein the other server includes either (1) a merchant database where the session identifier is associated with an account identifier as the resource identifier for the user session, the account identifier being obtained from the target traffic-records and included as the adidentifying information in the causal record selection, or (2) a payment processor where the session identifier is associated with a purchase-card identifier as the resource identifier for the user session, the purchase-card identifier being obtained from the target traffic-records and included as the adidentifying information in the causal record selection.

2. The method according to claim 1, wherein the traffic records comprise message segments obtained from node points within the metanetwork, wherein the node points are communicatively coupled with services of the metanetwork.

3. The method according to claim 1, wherein generating the traffic records includes:

obtaining message segments from the metanetwork;

time stamping the message segments;

pre-filtering the time stamped message segments to determine a source, destination, and segment size of the time stamped message segments; and assembling the time stamped message segments into a traffic record.

4. The method according to claim 3, further comprising one or more of decrypting and decoding the time stamped message segments and performing deep packet inspection of the time stamped message segments.

5. The method according to claim 4, further comprising determining a user identification associated with message segments that have been subjected to deep packet inspection.

6. The method according to claim 1, further comprising modeling congestion delay for the metanetwork using the causal digraph and predicting a service delay by comparing a benchmark congestion model to a subsequent congestion model.

7. The method according to claim 1, further comprising storing the network topology graph and the causal digraph in a record, the record being stored in a storage media.

8. A correlative monitoring, analysis and control (MAC) system for use in connection with a production metanetwork having a plurality of interconnected networks including an intranet, an extranet, and a public internet, comprising:

tap nodes disposed on respective communication channels within the metanetwork to generate traffic records from message segments obtained from the communication channels, the traffic records including time information, source/destination information, and message content taken from the message segments, the traffic records being divided into distinct probe traffic records and target traffic records; and at least one computing device comprising a memory that includes executable instructions and a processor executing the instructions to:
generate a metanetwork traffic model for the metanetwork, the metanetwork traffic model including (1) a network topology graph of the metanetwork, the network topology graph created using, as input traffic records, the traffic records obtained from the metanetwork;
a network segment transit-time digraph of the metanetwork, the network-segment transit-time digraph created using the input traffic records;
executing an event etiologizer to process the input traffic records, the network topology graph and the network segment transit-time graph to generate causal traffic-record selections, each including a respective probe traffic-record and a respective target traffic-record, the event etiologizer including a causal traffic-record filter operative for each probe traffic-record to select causally related target-traffic records for inclusion in a causal-record selection for the probe traffic-record;
processing each causal traffic-record selection to generate a corresponding augmented traffic record by augmenting the message content of the probe traffic-record with adidentifying information obtained from the message content of the respective target traffic-records of the causal traffic-record selection, the adidentifying information providing supplemental distinguishing information for the augmented traffic record; and
displaying respective renderings of the augmented traffic-records to an analyst user,
wherein (a) the probe traffic-records are provided by a first tap node in front of or behind a merchant web server and include a given probe traffic-record with a session identifier of a user session on the merchant web server, (b) the respective target traffic-records of the causal record selection containing the given probe traffic-record are provided by a second tap node tapping traffic to and from another server where the session identifier is associated with a resource identifier of a resource used in the session, and (c) the augmented traffic-record of the causal record selection includes (i) the session identifier from the given probe-traffic record, and (ii) as the adidentifying information, the resource identifier for the user session
wherein the other server includes either (1) a merchant database where the session identifier is associated with an account identifier as the resource identifier for the user session, the account identifier being obtained from the target traffic-records and included as the adidentifying information in the causal record selection, or (2) a payment processor where the session identifier is associated with a purchase-card identifier as the resource identifier for the user session, the purchase-card identifier being obtained from the target traffic-records and included as the adidentifying information in the causal record selection.

9. The system according to claim 8, wherein the tap nodes are operative, when generating the traffic records, to:
obtain message segments from the metanetwork via node points;
time stamp the message segments;
pre-filter the time stamped message segments to determine a source, destination, and segment size of the time stamped message segments; and
assemble the time stamped message segments into a traffic record.

10. The system according to claim 9, wherein the processor further executes the instructions to one or more of decrypt and decode the time stamped message segments.

11. The system according to claim 9, wherein the processor further executes the instructions to perform deep packet inspection of the time stamped message segments.

12. The system according to claim 8, wherein the processor further executes the instructions to:
model congestion delay for at least a portion of the metanetwork using the causal digraph; and
predict delay for a message segment being transmitted through at least a portion of the metanetwork.

13. The system according to claim 8, wherein the processor further executes the instructions to store the network topology graph and the causal digraph in a record, the record being stored in a storage media.

14. The system according to claim 8, wherein the traffic records comprise message segments obtained from node points within the metanetwork, wherein the node points are communicatively coupled with services of the metanetwork.

15. The system according to claim 14, wherein the node points comprise bidirectional taps that detect input and output message segments of the services and networks, wherein the system further comprises a traffic monitor that receives traffic records from the bidirectional taps.

16. The system according to claim 14, wherein the node points comprise bidirectional shunts that divert input and output message segments of the services and networks to a traffic monitor.

17. The system according to claim 14, wherein a node point comprises any of a pair of unidirectional taps, a bidirectional multitap, a multiplexing bidirectional tap, or combinations thereof.

18. The system according to claim 14, wherein the metanetwork comprises any of a shared-hub network, a shared-bus network, a token-ring network, a daisy-chain network, a switched network comprising a port mirroring switch, a switched network comprising bidirectional shunts.

19. The system according to claim 14, wherein the at least one computing system and the node points are in apposed communicative coupling with the metanetwork.

20. The system according to claim 14, wherein the at least one computing system and the node points are in interposed communicative coupling with the metanetwork.

21. The system according to claim 8, wherein the causal traffic-record filter of the event etiologizer includes:
a euchronological target-epoch estimator using information from the metanetwork traffic model to estimate a temporal boundary between assay traffic-records related euchronologically versus dyschronologically to a given probe traffic-record in a given temporal direction and output the result as probe-assay euchronological epoch;
a euchronological traffic-record filter that filters the assay traffic-records in accordance with the probe-assay euchronological epoch and the given temporal direction, the filtering including (a) for a forwards temporal direction, rejecting those assay traffic-records whose start-time occurs before the epoch while passing those as followers whose start-time occurs at or after the epoch, and (b) for a backwards temporal direction, rejecting those assay traffic-records whose start-time occurs after the epoch and passing those as leaders whose start-time occurs at or before the epoch; and
a target-coidentifier traffic-record filter that filters euchronological-assay traffic-records in accordance with a probe coidentifier, an assay coidentifier, and the given temporal direction, passing as the target traffic-records those assay traffic-records whose assay coidentifier matches the probe coidentifier, and rejecting those assay traffic-records whose coidentifiers do not match, where the assay coidentifier is extracted from the assay traffic-records in accordance with a target coidentifier field-descriptor, and the probe coidentifier is extracted from a corresponding probe traffic-record in accordance with a probe coidentifier field-descriptor.

* * * * *